United States Patent
Eistein et al.

(10) Patent No.: US 12,143,258 B2
(45) Date of Patent: Nov. 12, 2024

(54) ITERATIVE PHASE-NOISE CANCELLATION

(71) Applicant: QUALCOMM Incorporated, San Diego, CA (US)

(72) Inventors: Yaniv Eistein, Tel Aviv (IL); Ronen Shaked, Kfar Saba (IL); Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/506,616

(22) Filed: Oct. 20, 2021

(65) Prior Publication Data

US 2023/0124141 A1 Apr. 20, 2023

(51) Int. Cl.
*H04L 27/34* (2006.01)
*H04L 27/00* (2006.01)
*H04L 27/26* (2006.01)

(52) U.S. Cl.
CPC ...... *H04L 27/3472* (2013.01); *H04L 27/0014* (2013.01); *H04L 27/2688* (2013.01); *H04L 2027/0067* (2013.01)

(58) Field of Classification Search
None
See application file for complete search history.

(56) References Cited

U.S. PATENT DOCUMENTS 6,108,375 A * 8/2000 Farrokh ............ H04L 25/03019
375/345
7,612,626 B2 * 11/2009 Tang ..................... H03B 5/1228
331/177 V (Continued)

FOREIGN PATENT DOCUMENTS

BR 112020023701 A2 * 2/2021 ........... H04L 1/0003
CA 3155677 A1 * 5/2021 ............. H04B 1/123

(Continued)

OTHER PUBLICATIONS

A. S. Kashi, et al., "Extending a Nonlinear SNR Estimator to Include Shaping Distribution Identification for Probabilistically Shaped 64-QAM Signals," in Journal of Lightwave Technology, vol. 37, No. 13, pp. 3252-3260, 1 Jul. 1, 2019, doi: 10.1109/JLT.2019. (Year: 2019).*

(Continued)

*Primary Examiner* — Berhanu Tadese
(74) *Attorney, Agent, or Firm* — Holland & Hart LLP

(57) ABSTRACT

Methods, systems, and devices for wireless communications are described. A user equipment (UE) may transmit, to a base station, a request for a data transmission that includes multiple subsets of data each associated with a different constellation granularity. In response to the request, the base station may encode the data transmission using multiple different constellation granularities and may transit the encoded data transmission to the UE. For example, the UE may receive the data transmission including a first subset of data that was encoded by the base station using a first constellation granularity and a second subset of data that was encoded by the base station using a second constellation granularity. The UE may then iteratively estimate phase-noises associated with respective subsets of data and perform phase-noise correction operations on the entire data transmission based on the estimated phase-noises.

26 Claims, 18 Drawing Sheets

(56) References Cited

U.S. PATENT DOCUMENTS

| | | | | |
|---|---|---|---|---|
| 7,912,438 | B2* | 3/2011 | Filipovic | H04B 15/06 455/310 |
| 8,102,216 | B1* | 1/2012 | Kaczynski | H03B 5/1215 331/117 FE |
| 8,170,160 | B1* | 5/2012 | Shi | H04L 27/261 375/347 |
| 8,416,866 | B1* | 4/2013 | Cheng | H04L 27/2695 375/232 |
| 8,477,888 | B2* | 7/2013 | Lu | H04W 52/243 375/346 |
| 8,803,616 | B2* | 8/2014 | Zhang | H03L 7/104 331/177 V |
| 8,948,208 | B2* | 2/2015 | Malladi | H04B 7/0617 370/503 |
| 9,001,911 | B2* | 4/2015 | Fimoff | H04L 27/2655 375/261 |
| 9,031,122 | B2* | 5/2015 | Van Nee | H04L 5/0023 375/226 |
| 9,094,113 | B2* | 7/2015 | Yang | H04B 15/00 |
| 9,137,065 | B2* | 9/2015 | Gotman | H04L 1/205 |
| 9,237,053 | B2* | 1/2016 | Fimoff | H04L 1/0045 |
| 9,444,400 | B2* | 9/2016 | Taghivand | H03B 5/1243 |
| 10,097,254 | B2* | 10/2018 | Islam | H04W 72/23 |
| 10,097,255 | B2* | 10/2018 | Cezanne | H04L 25/022 |
| 10,116,483 | B2* | 10/2018 | Islam | H04L 5/0094 |
| 10,129,052 | B2* | 11/2018 | Subramanian | H04L 27/0014 |
| 10,270,455 | B2* | 4/2019 | Sun | H03L 7/087 |
| 10,367,672 | B2* | 7/2019 | Akkarakaran | H04L 27/2613 |
| 10,439,663 | B2* | 10/2019 | Islam | H04W 72/23 |
| 10,484,059 | B2* | 11/2019 | Faxér | H04B 7/0478 |
| 10,527,663 | B2* | 1/2020 | Mansour | H04B 17/354 |
| 10,536,319 | B2* | 1/2020 | Chen | H04L 27/38 |
| 10,581,660 | B2* | 3/2020 | Islam | H04L 27/2613 |
| 10,595,225 | B2* | 3/2020 | John Wilson | H04W 72/20 |
| 10,608,583 | B2* | 3/2020 | Taghivand | H03B 1/04 |
| 10,686,490 | B2* | 6/2020 | Park | H04L 1/005 |
| 10,735,143 | B2* | 8/2020 | Jia | H04L 5/003 |
| 10,778,493 | B2* | 9/2020 | Akkarakaran | H04L 27/2613 |
| 10,958,304 | B2* | 3/2021 | Park | H04L 27/34 |
| 11,115,086 | B1* | 9/2021 | Berliner | H04L 27/0014 |
| 11,218,906 | B2* | 1/2022 | John Wilson | H04L 5/0094 |
| 11,265,199 | B2* | 3/2022 | Touboul | H04L 27/2614 |
| 11,422,223 | B2* | 8/2022 | Kumar | G01S 5/021 |
| 11,502,889 | B2* | 11/2022 | Akkarakaran | G01S 13/346 |
| 11,581,911 | B2* | 2/2023 | Solichien | H04L 25/0328 |
| 11,616,676 | B1* | 3/2023 | Patchava | H04L 27/2655 375/262 |
| 11,621,874 | B2* | 4/2023 | Horn | H04L 27/364 370/329 |
| 11,700,081 | B1* | 7/2023 | Eistein | H04L 1/0026 714/726 |
| 11,711,186 | B2* | 7/2023 | Kutz | H04L 5/0051 370/329 |
| 2012/0002708 | A1 | 1/2012 | Freundlich et al. | |
| 2012/0051476 | A1* | 3/2012 | Shi | H04L 25/023 375/359 |
| 2012/0177161 | A1* | 7/2012 | Husted | H04L 27/0014 375/371 |
| 2012/0189085 | A1* | 7/2012 | Shi | H04L 27/2679 375/346 |
| 2013/0033293 | A1* | 2/2013 | Zhang | H03L 7/1976 327/156 |
| 2013/0099870 | A1* | 4/2013 | Terrovitis | H03B 5/1841 331/56 |
| 2018/0132122 | A1* | 5/2018 | Yoo | H04W 24/08 |
| 2019/0028092 | A1* | 1/2019 | Lu | H03K 5/1252 |
| 2019/0097678 | A1* | 3/2019 | Park | H04B 1/7103 |
| 2019/0140779 | A1* | 5/2019 | Jia | H04L 5/003 |
| 2020/0145161 | A1 | 5/2020 | Lee et al. | |
| 2020/0274576 | A1* | 8/2020 | Park | H04L 25/067 |
| 2021/0126662 | A1* | 4/2021 | Solichien | H04B 1/123 |
| 2021/0153199 | A1 | 5/2021 | Wong et al. | |
| 2021/0203438 | A1* | 7/2021 | Matsumura | H04L 5/0048 |
| 2021/0320747 | A1* | 10/2021 | Yoshioka | H04L 1/0009 |
| 2021/0344440 | A1* | 11/2021 | Yoshioka | H04L 1/008 |
| 2021/0392025 | A1* | 12/2021 | Touboul | H04L 27/2614 |
| 2022/0085908 | A1* | 3/2022 | Shaked | H04L 27/2646 |
| 2022/0141064 | A1* | 5/2022 | Horn | H04W 72/23 370/329 |
| 2022/0365164 | A1* | 11/2022 | Kumar | G01S 5/0205 |
| 2022/0368483 | A1* | 11/2022 | Kutz | H04L 5/0048 |
| 2022/0385418 | A1* | 12/2022 | Paz | H04W 72/51 |
| 2022/0385419 | A1* | 12/2022 | Paz | H04W 72/02 |
| 2022/0408289 | A1* | 12/2022 | Soltani | H04L 5/0051 |
| 2023/0053678 | A1* | 2/2023 | Paz | H04L 5/0048 |
| 2023/0124141 | A1* | 4/2023 | Eistein | H04B 1/123 375/262 |
| 2023/0198656 | A1* | 6/2023 | Matsumura | H04W 72/0446 370/329 |

FOREIGN PATENT DOCUMENTS

| | | | | |
|---|---|---|---|---|
| CN | 102413094 | A * | 4/2012 | |
| CN | 202818363 | U * | 3/2013 | |
| CN | 102413094 | B * | 4/2014 | |
| CN | 106576037 | A * | 4/2017 | H03M 13/25 |
| CN | 109845126 | A * | 6/2019 | H04B 7/0452 |
| CN | 106576037 | B * | 4/2020 | H03M 13/25 |
| CN | 111164944 | A * | 5/2020 | H04B 1/7103 |
| CN | 112189327 | A * | 1/2021 | H04L 1/0003 |
| CN | 111164944 | B * | 2/2021 | H04B 1/7103 |
| CN | 112805973 | A * | 5/2021 | H04B 7/0456 |
| CN | 112930666 | A * | 6/2021 | H04L 1/0004 |
| CN | 118104140 | A * | 5/2024 | H04B 1/123 |
| EP | 2245751 | B1 * | 12/2011 | H04B 1/7176 |
| EP | 2613460 | A1 * | 7/2013 | H04B 10/548 |
| EP | 3688947 | A1 * | 8/2020 | H04B 1/7103 |
| EP | 3799378 | A1 * | 3/2021 | H04L 1/0003 |
| EP | 3836500 | A1 * | 6/2021 | H04B 7/0456 |
| EP | 4052392 | A1 * | 9/2022 | H04B 1/123 |
| ES | 2379320 | T3 * | 4/2012 | H04B 1/7176 |
| FR | 2927205 | A1 * | 8/2009 | H04B 1/7176 |
| JP | 7370971 | B2 * | 10/2023 | H04L 1/0003 |
| RU | 2737391 | C2 * | 11/2020 | H04L 1/0003 |
| RU | 2787683 | C2 * | 1/2023 | H04L 1/0003 |
| WO | WO-2009095430 | A1 * | 8/2009 | H04B 1/7176 |
| WO | WO-2013109350 | A1 * | 7/2013 | H04L 1/0045 |
| WO | WO-2018050117 | A1 * | 3/2018 | H04L 27/36 |
| WO | WO-2019067767 | A1 * | 4/2019 | H04B 1/7103 |
| WO | WO-2019225685 | A1 * | 11/2019 | H04B 1/7103 |
| WO | WO-2020003543 | A1 * | 1/2020 | |
| WO | WO-2020031357 | A1 * | 2/2020 | H04B 7/0456 |
| WO | WO-2020031392 | A1 * | 2/2020 | |
| WO | WO-2020035956 | A1 * | 2/2020 | H04L 1/0004 |
| WO | WO-2021086986 | A1 * | 5/2021 | H04B 1/123 |
| WO | WO-2022030656 | A1 * | 2/2022 | H04B 1/0003 |
| WO | WO-2022051116 | A1 * | 3/2022 | H04B 7/022 |
| WO | WO-2023069808 | A1 * | 4/2023 | H04B 1/123 |

OTHER PUBLICATIONS

Yi Jiang, J. Li and W. W. Hager, "MIMO transceiver design using geometric mean decomposition," Information Theory Workshop, San Antonio, TX, USA, 2004, pp. 193-197, doi: 10.1109/ITW.2004.1405298. (Year: 2004).*

Gu S., et al., "Phase Noise Estimation and Compensation Algorithms for 5G Systems, 13th EAI International Conference, ChinaCom 2018, Chengdu, China, Oct. 23-25, 2018, Proceedings", In: "Forensics in Telecommunications, Information and Multimedia : Second International Conference, e-Forensics, 2009, Adelaide, Australia, Jan. 19-21, 2009, Revised Selected Papers", Jan. 1, 2019, Springer International Publishing, CH, XP55859357, vol. 262, pp. 551-561, the whole document.

International Search Report and Written Opinion—PCT/US2022/076403—ISA/EPO—Dec. 22, 2022.

* cited by examiner

ITERATIVE PHASE-NOISE CANCELLATION

FIELD OF TECHNOLOGY

The present disclosure relates to wireless communications, including iterative phase-noise cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support iterative phase-noise cancellation. Generally, the described techniques provide for iterative phase-noise correction operations (e.g., cancellation operations) on data transmissions that include multiple subsets of data each associated with different constellation granularities. For example, a base station may encode a data transmission using multiple constellation granularities. Here, the base station may encode a first subset of data in the data transmission using a first constellation granularity (e.g., a relatively low constellation granularity), and one or more additional subsets of data in the data transmission using increasing constellation granularities. For example, the base station may encode a second subset of data in the data transmission using a second, higher, constellation granularity.

Upon receiving the data transmission from the base station, a user equipment (UE) may perform iterative phase-noise correction operations on the data transmission. For example, the UE may estimate a first phase-noise associated with the first subset of data and may perform a first phase-noise correction operation on the data transmission based on the first estimated phase-noise. Then, the UE may estimate a second phase-noise associated with the first subset of data and a second subset of data and may perform a second phase-noise correction operation on the data transmission based on the second estimated phase-noise.

A method for wireless communication at a user equipment (UE) is described. The method may include transmitting, to a base station, a request for a data transmission including multiple subsets of data, each subset of data associated with a different constellation granularity, receiving, from the base station in response to the request, the data transmission including a first subset of data associated with a first constellation granularity and a second subset of data associated with a second constellation granularity, estimating a first phase-noise associated with the first subset of data based on decoding the first subset of data, and estimating, based on estimating the first phase-noise associated with the first subset of data, a second phase-noise associated with the second subset of data.

An apparatus for wireless communication at a UE is described. The apparatus may include a processor, memory coupled with the processor, and instructions stored in the memory. The instructions may be executable by the processor to cause the apparatus to transmit, to a base station, a request for a data transmission including multiple subsets of data, each subset of data associated with a different constellation granularity, receive, from the base station in response to the request, the data transmission including a first subset of data associated with a first constellation granularity and a second subset of data associated with a second constellation granularity, estimate a first phase-noise associated with the first subset of data based on decoding the first subset of data, and estimate, based on estimating the first phase-noise associated with the first subset of data, a second phase-noise associated with the second subset of data.

Another apparatus for wireless communication at a UE is described. The apparatus may include means for transmitting, to a base station, a request for a data transmission including multiple subsets of data, each subset of data associated with a different constellation granularity, means for receiving, from the base station in response to the request, the data transmission including a first subset of data associated with a first constellation granularity and a second subset of data associated with a second constellation granularity, means for estimating a first phase-noise associated with the first subset of data based on decoding the first subset of data, and means for estimating, based on estimating the first phase-noise associated with the first subset of data, a second phase-noise associated with the second subset of data.

A non-transitory computer-readable medium storing code for wireless communication at a UE is described. The code may include instructions executable by a processor to transmit, to a base station, a request for a data transmission including multiple subsets of data, each subset of data associated with a different constellation granularity, receive, from the base station in response to the request, the data transmission including a first subset of data associated with a first constellation granularity and a second subset of data associated with a second constellation granularity, estimate a first phase-noise associated with the first subset of data based on decoding the first subset of data, and estimate, based on estimating the first phase-noise associated with the first subset of data, a second phase-noise associated with the second subset of data.

Some examples of the method, apparatuses, and non-transitory computer-readable medium described herein may further include operations, features, means, or instructions for receiving, from the base station, a response to the request indicating that the data transmission includes multiple subsets of data and each subset of data may be associated with the different constellation granularities, where receiving the data transmission may be based on receiving the response.

Some examples of the method, apparatuses, and non-transitory computer-readable medium described herein may further include operations, features, means, or instructions for performing a first phase-noise correction operation on the data transmission based on the estimated first phase-noise, where estimating the second phase-noise may be based on performing the first phase-noise correction operation.

Some examples of the method, apparatuses, and non-transitory computer-readable medium described herein may further include operations, features, means, or instructions for performing a second phase-noise correction operation on the data transmission based on the second estimated phase-noise.

Some examples of the method, apparatuses, and non-transitory computer-readable medium described herein may further include operations, features, means, or instructions for determining that a signal to noise ratio associated with a transmission received from the base station fails to meet a threshold, where transmitting the request may be based on the determining.

In some examples of the method, apparatuses, and non-transitory computer-readable medium described herein, the threshold may be based on a constellation granularity associated with the transmission received from the base station.

Some examples of the method, apparatuses, and non-transitory computer-readable medium described herein may further include operations, features, means, or instructions for transmitting the request may be based on a capability of the UE to decode data transmissions including multiple subsets of data each associated with the different constellation granularities.

In some examples of the method, apparatuses, and non-transitory computer-readable medium described herein, the data transmission further includes a phase tracking reference signal and estimating the second phase-noise associated with the second subset of data may be further based on an estimated third phase-noise associated with the phase tracking reference signal.

Some examples of the method, apparatuses, and non-transitory computer-readable medium described herein may further include operations, features, means, or instructions for transmitting, to the base station after receiving the data transmission, a second request for a second data transmission including a single subset of data associated with a single constellation granularity and receiving, from the base station based on transmitting the second request, the second data transmission including the single subset of data associated with the single constellation granularity.

Some examples of the method, apparatuses, and non-transitory computer-readable medium described herein may further include operations, features, means, or instructions for determining that a signal to noise ratio associated with the data transmission satisfies a threshold, where transmitting the second request may be based on the determining.

Some examples of the method, apparatuses, and non-transitory computer-readable medium described herein may further include operations, features, means, or instructions for receiving, from the base station, a response to the second request indicating that the second data transmission includes the single subset of data associated with the single constellation granularity, where receiving the second data transmission may be based on receiving the response.

In some examples of the method, apparatuses, and non-transitory computer-readable medium described herein, the first constellation granularity may be lower than the second constellation granularity and the first subset of data spans a smaller quantity of resource elements than the second subset of data.

In some examples of the method, apparatuses, and non-transitory computer-readable medium described herein, the first subset of data spans a first set of time resources and a first set of frequency resources and the second subset of data spans the first set of time resources and a second set of frequency resources.

In some examples of the method, apparatuses, and non-transitory computer-readable medium described herein, the first set of frequency resources may be lower in frequency than the second set of frequency resources and the first constellation granularity may be lower than the second constellation granularity.

A method for wireless communication at a base station is described. The method may include receiving, from a UE, a request for a data transmission including multiple subsets of data, each subset of data associated with a different constellation granularity, encoding, based on receiving the request, a first subset of data in the data transmission using a first constellation granularity and a second subset of data in the data transmission using a second constellation granularity, and transmitting, to the UE, the data transmission including the first subset of data associated with the first constellation granularity and the second subset of data associated with the second constellation granularity.

An apparatus for wireless communication at a base station is described. The apparatus may include a processor, memory coupled with the processor, and instructions stored in the memory. The instructions may be executable by the processor to cause the apparatus to receive, from a UE, a request for a data transmission including multiple subsets of data, each subset of data associated with a different constellation granularity, encode, based on receiving the request, a first subset of data in the data transmission using a first constellation granularity and a second subset of data in the data transmission using a second constellation granularity, and transmit, to the UE, the data transmission including the first subset of data associated with the first constellation granularity and the second subset of data associated with the second constellation granularity.

Another apparatus for wireless communication at a base station is described. The apparatus may include means for receiving, from a UE, a request for a data transmission including multiple subsets of data, each subset of data associated with a different constellation granularity, means for encoding, based on receiving the request, a first subset of data in the data transmission using a first constellation granularity and a second subset of data in the data transmission using a second constellation granularity, and means for transmitting, to the UE, the data transmission including the first subset of data associated with the first constellation granularity and the second subset of data associated with the second constellation granularity.

A non-transitory computer-readable medium storing code for wireless communication at a base station is described. The code may include instructions executable by a processor to receive, from a UE, a request for a data transmission including multiple subsets of data, each subset of data associated with a different constellation granularity, encode, based on receiving the request, a first subset of data in the data transmission using a first constellation granularity and a second subset of data in the data transmission using a second constellation granularity, and transmit, to the UE, the data transmission including the first subset of data associated with the first constellation granularity and the second subset of data associated with the second constellation granularity.

Some examples of the method, apparatuses, and non-transitory computer-readable medium described herein may further include operations, features, means, or instructions for transmitting, to the UE, a response to the request indicating that the data transmission includes multiple subsets of data and each subset of data may be associated with the different constellation granularities, where the encoding may be based on transmitting the response.

Some examples of the method, apparatuses, and non-transitory computer-readable medium described herein may further include operations, features, means, or instructions for encoding a phase tracking reference signal in the data transmission using a third constellation granularity, where transmitting the data transmission may be based on encoding the phase tracking reference signal.

Some examples of the method, apparatuses, and non-transitory computer-readable medium described herein may further include operations, features, means, or instructions for receiving, from the UE after transmitting the data transmission, a second request for a second data transmission including a single subset of data associated with a single constellation granularity, encoding the single subset of data using the single constellation granularity based on receiving the second request, and transmitting, to the UE, the second data transmission including the single subset of data associated with the single constellation granularity.

Some examples of the method, apparatuses, and non-transitory computer-readable medium described herein may further include operations, features, means, or instructions for transmitting, to the UE, a response to the second request indicating that the second data transmission includes the single subset of data associated with the single constellation granularity, where transmitting the second data transmission may be based on transmitting the response.

In some examples of the method, apparatuses, and non-transitory computer-readable medium described herein, the first constellation granularity may be lower than the second constellation granularity and the first subset of data spans a smaller quantity of resource elements than the second subset of data.

In some examples of the method, apparatuses, and non-transitory computer-readable medium described herein, the first subset of data spans a first set of time resources and a first set of frequency resources and the second subset of data spans the first set of time resources and a second set of frequency resources.

In some examples of the method, apparatuses, and non-transitory computer-readable medium described herein, the first set of frequency resources may be lower in frequency than the second set of frequency resources and the first constellation granularity may be lower than the second constellation granularity.

DETAILED DESCRIPTION

Figure 1:
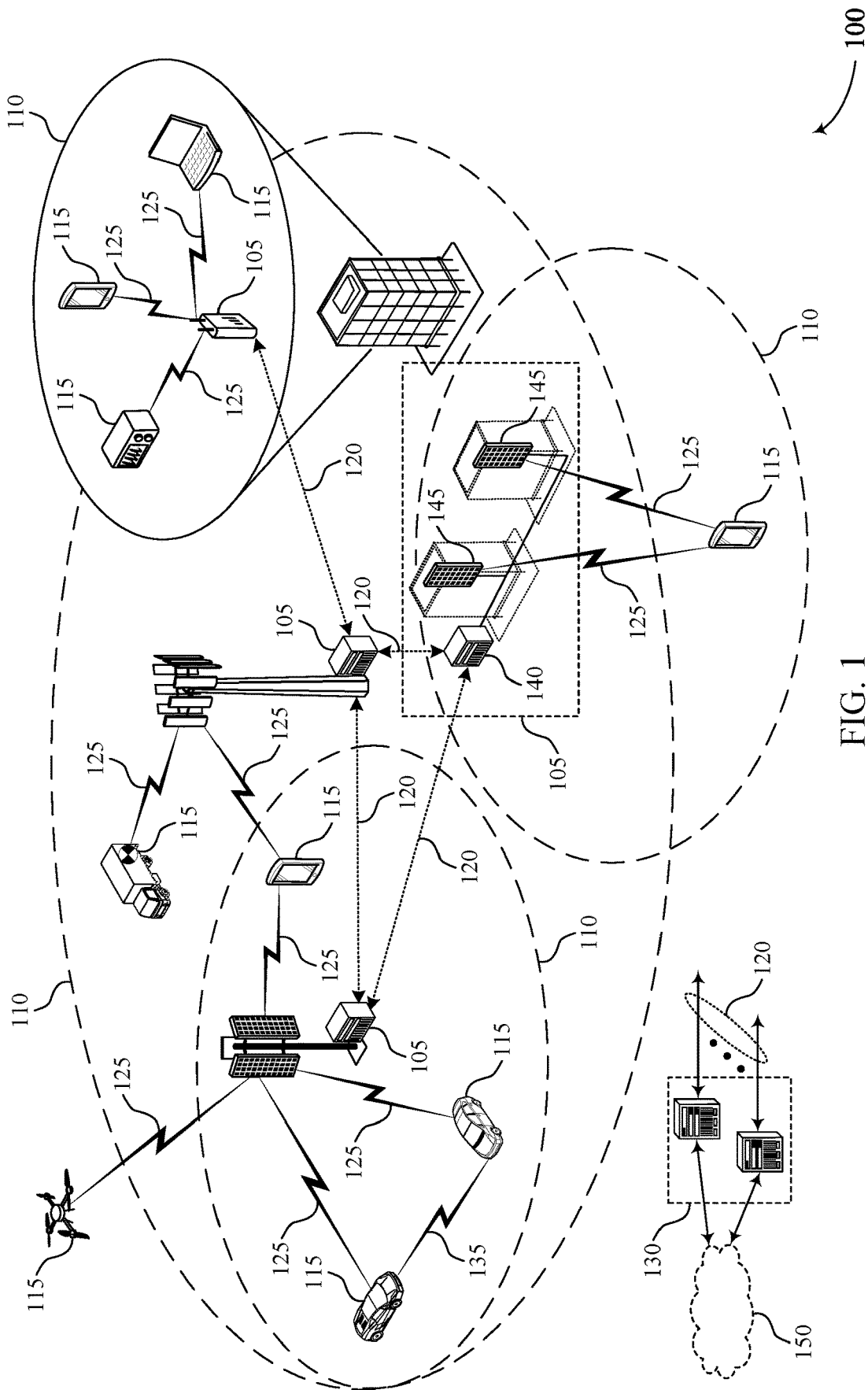
FIG. 1 illustrates an example of a wireless communications system that supports iterative phase-noise cancellation in accordance with aspects of the present disclosure.

In some wireless communications systems, a user equipment (UE) may perform a phase-noise correction operation on a data transmission received from a base station, which may improve a reliability of decoding the data transmission. For example, the data transmission may include a phase tracking reference signal (PTRS) that is encoded by the base station using a relatively low constellation granularity in addition to data that is encoded by the base station using a higher constellation granularity. Here, the UE may estimate a phase-noise associated with the PTRS and perform the phase-noise correction operation (e.g., based on the estimated phase-noise) on the data in the data transmission. Then, the UE may decode the data in the data transmission with a higher reliability when compared to a UE decoding the data without first performing a phase-noise correction operation on the data. In some cases, even after performing the phase-noise correction operation based on a phase-noise estimated in a PTRS, the UE may be unable to successfully decode data associated with a relatively high constellation granularity. That is, as a constellation granularity of a data transmission increases, an amount of phase-noise present in the data transmission may decrease (e.g., to maintain a similar reliability).

To enable a UE to decode data transmissions with higher constellation granularities, a UE may be configured to perform iterative phase-noise correction operations on a data transmission. For example, a base station may encode the data transmission using multiple constellation granularities. Here, the base station may encode a first subset of data in the data transmission using a first constellation granularity (e.g., a relatively low constellation granularity), and one or more additional subsets of data in the data transmission using increasing constellation granularities. For example, the base station may encode a second subset of data in the data transmission using a second, higher, constellation granularity.

Upon receiving the data transmission from the base station, the UE may perform iterative phase-noise cancellation operations on the data transmission. For example, the UE may estimate a first phase-noise associated with the first subset of data and may perform a first phase-noise correction operation on the data transmission based on the first estimated phase-noise. Then, the UE may estimate a second phase-noise associated with the first subset of data and a second subset of data and may perform a second phase-noise correction operation on the data transmission based on the second estimated phase-noise. In some cases, the iterative phase-noise correction operations may decrease a phase-noise present in the data transmission, thus enabling the UE to decode data encoded using the higher constellation granularities without a significant decrease in reliability.

Aspects of the disclosure are initially described in the context of wireless communications systems. Then, the disclosure is described in the context of flowcharts and a process flow. Aspects of the disclosure are further illustrated by and described with reference to apparatus diagrams, system diagrams, and flowcharts that relate to iterative phase-noise cancellation.

FIG. 1 illustrates an example of a wireless communications system 100 that supports iterative phase-noise cancellation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the constellation granularity, the order of the modulation scheme, the coding rate of the modulation scheme, or both). Thus, the more resource elements that a UE 115 receives and the higher the order of the modulation scheme or constellation granularity, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In wireless communications system 100, a UE 115 may perform a phase-noise correction operation on a data transmission received from a base station 105, which may improve a reliability of decoding the data transmission. That is, phase-noise may originate at a transmitter (e.g., a radio frequency transmitter) of the base station 105 and at a receiver (e.g., a radio frequency receiver) of the UE 115. The phase-noise may inhibit reliable data transmissions between the base station 105 and UE 115, especially as the constellation granularity of the data transmissions increases. The phase-noise correction operations may enable a device (e.g., a UE 115) to estimate a phase-noise associated with a data transmission and correct (e.g., decrease) that estimated phase-noise in the data transmission. Thus, the phase-noise correction operation may improve a reliability of the data transmission received by the UE 115 (e.g., by decreasing the amount of phase-noise in the data transmission). The phase-noise correction operations may be based on pilot-based estimation, blind estimation from the data transmission, or both.

In one example of the UE 115 performing a phase-noise correction operation, the data transmission may include a PTRS that is encoded by the base station 105 using a relatively low constellation granularity in addition to data that is encoded by the base station 105 using a higher constellation granularity. Here, the UE 115 may estimate a phase-noise associated with the PTRS and perform the phase-noise correction operation (e.g., based on the estimated phase-noise) on the data in the data transmission. Then, the UE 115 may decode the data in the data transmission with a higher reliability when compared to a UE 115 decoding the data without first performing a phase-noise correction operation on the data. In some cases, even after performing the phase-noise correction operation based on a phase-noise estimated in a PTRS, the UE 115 may be unable to successfully decode data associated with a relatively high constellation granularity. That is, as a constellation granularity of a data transmission increases, an amount of phase-noise present in the data transmission may decrease (e.g., to maintain a similar reliability).

To enable a UE 115 to decode data transmissions with higher constellation granularities, a UE 115 may be configured to perform iterative phase-noise correction operations on a data transmission. For example, a base station 105 may encode the data transmission using multiple constellation granularities. Here, the base station 105 may encode a first subset of data in the data transmission using a first constellation granularity (e.g., a relatively low constellation granularity), and one or more additional subsets of data in the data transmission using increasing constellation granularities. For example, the base station 105 may encode a second subset of data in the data transmission using a second, higher, constellation granularity.

Upon receiving the data transmission from the base station 105, the UE 115 may perform iterative phase-noise correction operations on the data transmission. For example, the UE 115 may estimate a first phase-noise associated with the first subset of data and may perform a first phase-noise correction operation on the data transmission based on the first estimated phase-noise. Then, the UE 115 may estimate a second phase-noise associated with the first subset of data and a second subset of data and may perform a second phase-noise correction operation on the data transmission based on the second estimated phase-noise. In some cases, the iterative phase-noise correction operations may decrease a phase-noise present in the data transmission, thus enabling the UE 115 to decode data encoded using the higher constellation granularities without a significant decrease in reliability.

Figure 2:
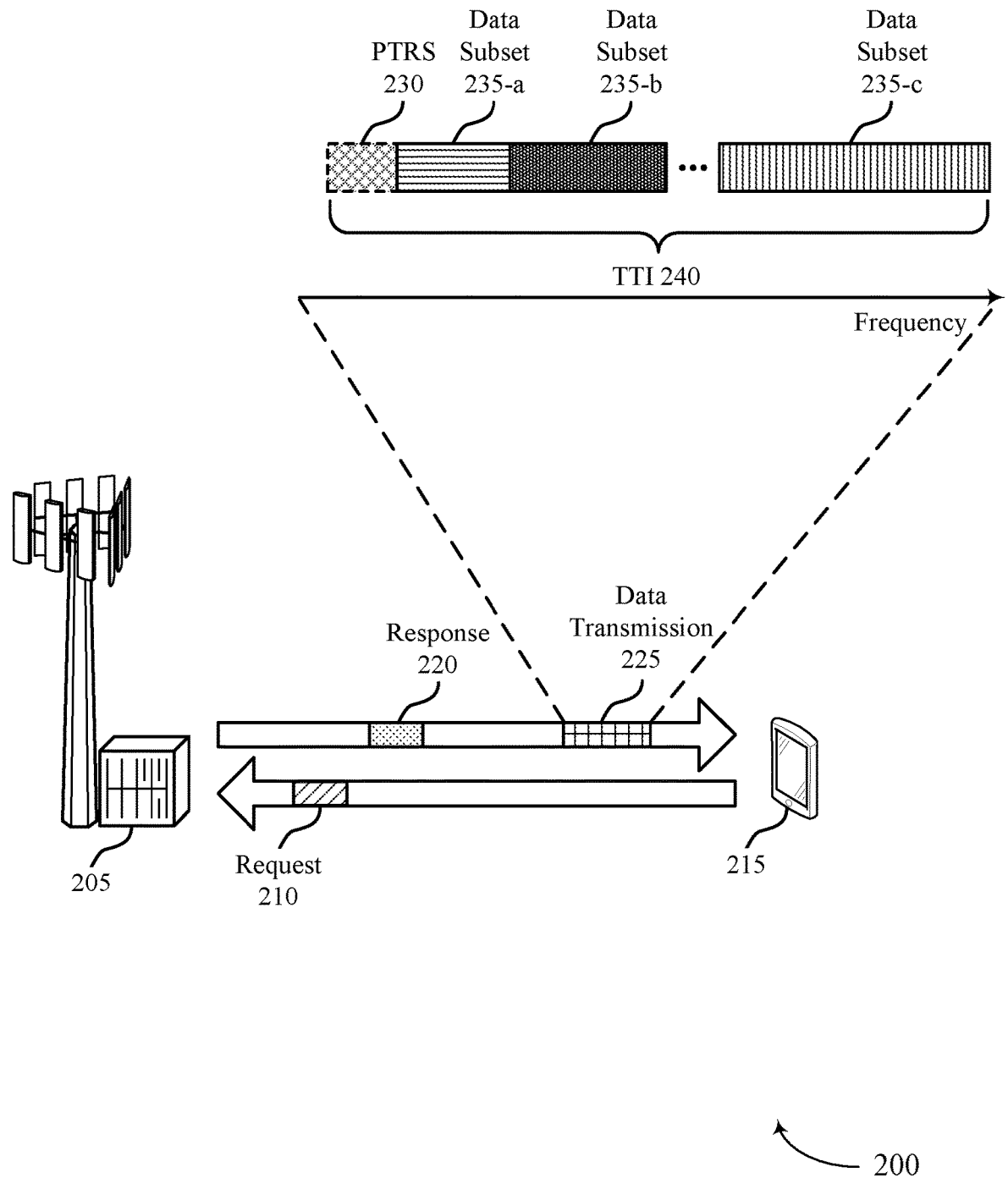
FIG. 2 illustrates an example of a wireless communications system that supports iterative phase-noise cancellation in accordance with aspects of the present disclosure.

FIG. 2 illustrates an example of a wireless communications system 200 that supports iterative phase-noise cancellation in accordance with aspects of the present disclosure. In some examples, the wireless communications system 200 may implement aspects of the wireless communications system 100 or may be implemented by aspects of the wireless communications system 100 as described with reference to FIG. 1. For example, the wireless communications system 200 may include a UE 215 and a base station 205, which may be examples of corresponding devices described herein with reference to FIG. 1. The wireless communications system 200 may include features for improved communications between the UE 215 and the base stations 205, among other benefits.

The UE 215 may be capable of performing iterative phase-noise correction operations. That is, the UE 215 may have a capability to receive a data transmission 225 with multiple data subsets 235 each associated with different constellation granularities 245. In instances that the UE 215 has this capability, the UE 215 may transmit, to the base station 205, a request 210 for a data transmission 225 including the multiple data subsets 235 each associated with different constellation granularities 245. In some cases, the request 210 may be a request 210 from the base station 205 to map data within a TTI 240 (e.g., a transport block within a symbol) based on a gradual constellation, rather than based on a fixated order constellation.

The UE 215 may determine whether to transmit the request 210 based on a detected signal quality (e.g., a signal to noise ratio (SNR)) associated with communications from the base station 205. That is, in cases that the detected signal quality fails to meet a threshold, the UE 215 may determine to transmit the request 210. Additionally, in cases that the detected signal quality exceeds the threshold, the UE 215 may determine to refrain from transmitting the request 210. In some cases, the threshold may be based on the modulation coding scheme associated with the communications from the base station 205. That is, in cases that the modulation coding scheme associated with communications from the base station 205 is a relatively low order (e.g., the communications have a low constellation granularity 245-$a$), the threshold for the detected signal quality may also be relatively low. Additionally, as the order of the modulation coding scheme of the communications increases (e.g., as the constellation granularity 245 increases), the threshold for the detected signal quality may also increase. That is, when communications have a low order modulation coding scheme (e.g., are associated with a low constellation granularity 245-$a$), phase-noise may not impact a throughput of the communications as significantly as when the modulation coding scheme order increases (e.g., when the communications are associated with intermediate constellation granularity 245-$b$ or the highest constellation granularity 245-$c$).

In cases that the communications from the base station 205 include data transmission 225 with multiple data subsets 235 each associated with different constellation granularities 245 and the communications have a signal quality that exceeds the threshold, the UE 215 may instead transmit a request 210 for the base station 205 to transmit a subsequent data transmission 225 with a fixed constellation granularity 245. That is, the UE 215 may transmit a request 210 for the base station 205 to transmit a data transmission 225 with a single data subset 235 associated with a single constellation granularity 245.

In response to receiving the request 210 for a data transmission 225 to have a gradient of constellation granularities 245, the base station 205 may transmit the response 220 to the UE 215. The response 220 may indicate, to the UE 215, that a subsequent data transmission 225 (or that multiple subsequent data transmission 225) may be based on a gradient constellation granularity 245. That is, the response 220 may indicate that the data transmission 225 may include multiple data subsets 235 each associated with different constellation granularities 245.

The base station 205 may generate the data transmission 225. For example, the base station 205 may generate the data transmission 225 including the multiple data subsets 235 each associated with different constellation granularities 245 in response to receiving the request 210 from the UE 215. Additionally, the base station 205 may optionally include a PTRS 230 in the data transmission 225. In some cases, the base station 205 may encode a first data subset 235-$a$ using a lowest constellation granularity 245-$a$. Additionally, the base station 205 may encode a second data subset 235-$b$ using an intermediate (e.g., higher) constellation granularity 245-$b$. In some cases, the data transmission 225 may only include two data subsets 235. Additionally, the data transmission 225 may include more than two data subsets 235 (e.g., three, four, or more than four data subsets 235). For example, the base station 205 may additionally encode a third data subset 235-$c$ using a higher constellation granularity 245-$c$. In the example of wireless communications system 200, the data subset 235-$c$ is illustrated as having a highest constellation granularity 245-$c$ when compared to each of the other data subsets 235 in the data transmission 225.

In some instances, the data subsets 235 associated with lower constellation granularities 245 may be smaller (e.g., may span less resources) than data subsets 235 associated with higher constellation granularities 245. That is, the data subset 235-$a$ associated with the lowest constellation granularity 245-$a$ may be the smallest (e.g., may span the least number of resources) while the data subset 235-$c$ associated with the highest constellation granularity 245-$c$ may be the largest (e.g., may span the greatest number of resources). Additionally, the data subsets 235 associated with lower constellation granularities 245 may be transmitted by the base station 205 over lower frequency resources than data subsets 235 associated with higher constellation granularities 245. That is, the base station 205 may transmit the data subset 235-$a$ associated with the lowest constellation granularity 245-$a$ using resources that span a lowest frequency of the data transmission 225 and may transmit the data subset 235-$c$ associated with the highest constellation granularity 245-$c$ using resources that span a highest frequency of the data transmission 225.

After generating the data transmission 225, the base station 205 may transmit the data transmission 225 to the UE 215 over the TTI 240 (e.g., a symbol). The UE 215 may receive the data transmission 225 and may decode the data transmission 225 to identify each of the data subsets 235. In some cases, the UE 215 may identify that the data transmission 225 includes multiple data subsets 235 each associated with different constellation granularities 245 based on receiving the response 220 from the base station 205.

Based on the data transmission 225 including the multiple data subsets 235 each associated with multiple constellation granularities 245, the UE 215 may perform an iterative phase-noise correction operation on the data transmission 225. For example, if the data transmission 225 includes a PTRS 230, the UE 215 may estimate a phase-noise associated with the PTRS 230 (e.g., which may have a constellation granularity 245 lower than a lowest constellation granularity 245-a of the data subsets 235). The UE 215 may then perform a first phase-noise correction operation on the data transmission 225. For example, the UE 215 may perform the first phase-noise correction operation to correct the PTRS 230 and the data subset 235-a having the lowest constellation granularity 245-a based on the estimated phase-noise from the PTRS 230.

Then, the UE 215 may estimate a second phase-noise associated with the data subset 235-a having a lowest constellation granularity 245-a (e.g., may estimate a phase-noise with the data transmission 225 using the phase-noise estimated in the data subset 235-a) and the previously-decoded PTRS 230. The UE 215 may perform a second phase-noise correction operation on the data transmission 225. For example, the UE 215 may correct the PTRS 230, the data subset 235-a, and the data subset 235-b having the intermediate constellation granularity 245-b based on the estimated second phase-noise.

The UE 215 may then estimate a third phase-noise associated with the data subset 235-b that has the intermediate constellation granularity 245-b (e.g., that is higher than the lowest constellation granularity 245-a and lower than the highest constellation granularity 245-c) and the previously-decoded PTRS 230 and data subset 245-a. The UE 215 may then perform a third phase-noise correction operation on the data transmission 225 based on the third estimated phase-noise. For example, the UE 215 may correct the PTRS 230, the data subset 235-a, the data subset 235-b, and the data subset 235 having the next-highest constellation granularity 245 based on the third estimated phase-noise.

The UE 215 may continue to perform the iterative error cancellation based on estimating phase-noises with each data subset 235 having an increasing constellation granularity 245 until the UE 215 performs a phase-noise error correction operation on the data transmission 225 based on an estimated phase-noise of the data subset 235-c having the highest constellation granularity 245-c, the data subset 235-b, the data subset 235-a, and the PTRS 230. That is, for each data subset 235, the UE 215 may estimate a phase-noise based that data subset 235 and each of the data subsets 235 in the data transmission 225 having a smaller constellation granularity 245 than that data subset 235. Then, the UE 215 may perform an error correction operation on that data subset 235, each of the data subsets 235 in the data transmission 225 having the smaller constellation granularity 245 than that data subset 235, and an additional data subset 235 having a next-highest constellation granularity 245.

In some cases, performing iterative phase-noise correction or cancellation operations may enable the UE 215 to reliably decode data subsets 235 that are associated with higher constellation granularities 245 when compared to a UE 215 that only performs a single phase-noise correction operation on a data transmission 225. That is, without performing a first phase-noise correction operation based on an estimated phase-noise of a data subset 235 having a relatively low constellation granularity 245 (e.g., data subset 235-a with the lowest constellation granularity 245-a), the UE 215 may be unable to reliable decode a data subset 235 associated with a higher constellation granularity 245 (e.g., the data subsets 235-b and 235-c with the constellation granularities 245-b and 245-c, respectively).

In some cases, the base station 205 may data according to a higher data rate (e.g., while maintaining a signal quality that enables a UE 215 to successfully decode the data) based on transmitting data including multiple data subsets 235 each associated with increasing constellation granularities 245. For example, when a base station 205 transmits data using a single constellation granularity 245, the base station 205 may transmit the data transmission 225 using a relatively low constellation granularity 245 (e.g., a lowest constellation granularity 245-a such as 64 quadrature amplitude modulation (QAM)), especially in cases when an SNR associated with the data transmission 225 due to phase-noise is relatively high (e.g., 26 decibels). Here, the data transmission 225 may be associated with 6 coded bits per resource block. In another case, the base station 205 may transmit a data transmission 225 including 4K QAM data (e.g., where the data transmission is associated with 12 coded bits per resource block), but the UE 215 may not be able to reliably decode this data transmission 225 due to the phase-noise.

In an example where the UE 215 performs a single phase-noise correction operation (e.g., on a PTRS 230) and the data is associated with a single constellation granularity 245, the base station 205 may transmit the data transmission 225 using a higher constellation granularity 245 (e.g., an intermediate constellation granularity 245-b such as 4K QAM). Here, the base station 205 may transmit the PTRS 230 within a portion of the data transmission 225 (e.g., within 464 resource blocks) and the data within a remaining portion of the data transmission 225 (e.g., within 2800 resource blocks). In this example, the data transmission 225 may be associated with 10.29 coded bits per resource block. In the example where the UE 215 performs iterative phase-noise correction operations, the base station 205 may transmit a data transmission 225 with a first and smallest data subset 235-a associated with a lowest constellation granularity 245-a and multiple additional data subsets 235, each increasing in size and constellation granularity 245. For example, the data transmission 225 may include 26 resource blocks with 64 QAM data, 32 resource blocks with 128 QAM data, 32 resource blocks with 256 QAM data, 64 resource blocks with 512 QAM data, 64 resource blocks with 2K QAM data, and 2800 resource blocks with 4K QAM data. In this example, the data transmission 225 may be associated with 11.71 coded bits of data per resource block.

More generally, each of the constellation granularities 345 may be indicated (e.g., in bits) by $\{q_1, q_2, \ldots q_M\}$, a chosen code rate may be indicated by $\{r_1, r_2, \ldots r_M\}$, and a width (e.g., in resource elements) of each constellation granularity 245 may be indicates be $\{w_1, w_2, \ldots w_M\}$. Here, a total transmission rate $R_{total}$ may be indicated according to Equation 1, shown below.

$$R_{total} = \frac{1}{BW} \sum_{i=1}^{M} w_i r_i q_i \qquad (1)$$

Further, an estimate of an SNR of the data transmission 225 after each phase-noise correction operation may depend on a number of data subsets 235 used for phase-noise estimation, where the number of data subsets or pilots may be indicated as $\Sigma_{i=1}^{M} w_i$. The SNR may additionally be based on an estimated channel (H), the estimated noise covariance (Cnn), and an estimated phase-noise power profile. Based on the estimated SNR (e.g., after the error correction operation or operations), a specific constellation (q) and rate (r) may indicate wither symbol error rate and cyclic redundancy check with fail or pass.

In this generalization, the parameters M, $$\{q_i\}\Big|_{i=1}^{M}, \{r_i\}\Big|_{i=1}^{M}, \text{ and } \{w_i\}\Big|_{i=1}^{M},$$

may be selected (e.g., by the base station 205, by the UE 215) such that each constellation is detectable using a slicer (e.g., under the condition of its specific iteration of the phase-noise correction operation such that the specific constellation passes as described above), each constellation-rate pair may be detectable using a decoder (e.g., after each of the phase-noise correction operations such that the data transmission 225 will pass a cyclic redundancy check), and the term is maximized.

Figure 3:
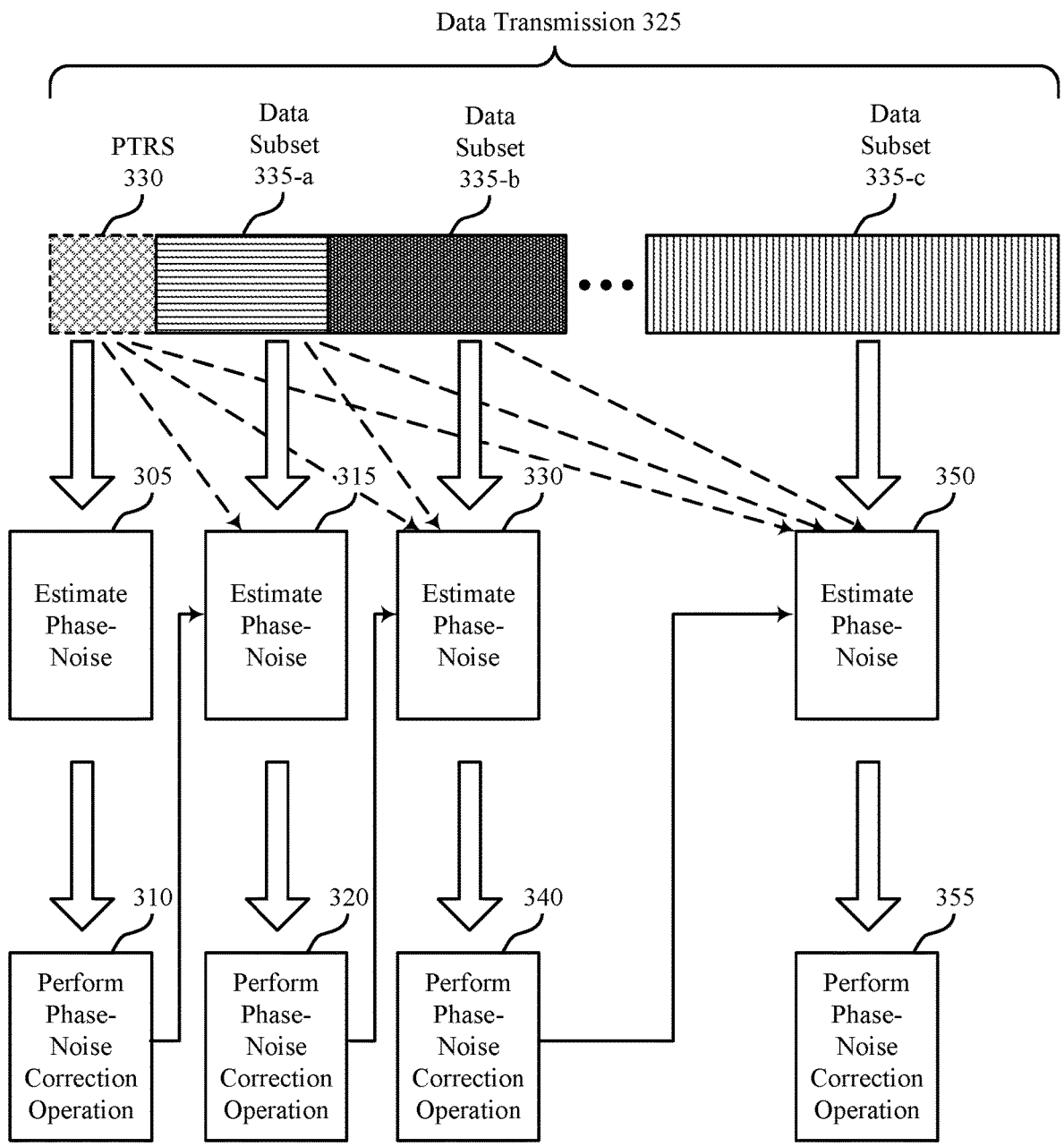
FIG. 3 illustrates an example of a flowchart that supports iterative phase-noise cancellation in accordance with aspects of the present disclosure.

FIG. 3 illustrates an example of a flowchart 300 that supports iterative phase-noise cancellation in accordance with aspects of the present disclosure. In some examples, the flowchart 300 may implement aspects of the wireless communications systems 100 and 200 or may be implemented by aspects of the wireless communications systems 100 and 200 as described with reference to FIGS. 1 and 2. For example, the flowchart 300 may be an example of the iterative phase-noise correction operations performed by a UE receiving a data transmission 325 as described with reference to FIGS. 1 and 2.

In some cases, prior to estimating a phase-noise at 305, a UE may receive a data transmission 325 including multiple data subsets 335 each associated with different constellation granularities 345 (e.g., as described with reference to FIGS. 1 and 2) and, optionally, a PTRS 330. The data transmission 325 may be a transport block and may span a TTI such as an OFDM symbol.

In cases that the data transmission 325 includes a PTRS, the UE may initially estimate a phase-noise associated with the PTRS 330 at 305. Otherwise, the UE may begin the iterative phase-noise correction operations at 315. The UE may then proceed to 310 and perform a phase-noise correction operation on the data transmission 325. That is, the UE may correct data within the PTRS 330 and the data subset 335-a having the next-highest constellation granularity 345-a based on the phase-noise estimated within the PTRS 330.

At 315, the UE may estimate a phase-noise associated with the data subset 335-a. In cases that the data transmission 325 includes the PTRS 330, this may include the UE decoding the data subset 335-a (e.g., after the data subset 335-a has undergone a first phase-noise correction operation at 310) and estimating, using a combination of the PTRS and the data subset 335-a, a phase-noise associated with the data transmission 325. Then, the UE may perform a phase-noise correction operation on the data transmission 325. For example, the UE may correct data within the PTRS 330, the data subset 335-a, and the data subset 335-b having the next-highest constellation granularity 345-b based on the phase-noise estimated with the data subset 335-a. The UE may then proceed to 330.

At 330, the UE may estimate a phase-noise associated with the data subset 335-b. That is, the UE may decode the data subset 335-b (e.g., after the data subset 335-b has undergone one or two previous error correction operations) and estimate the phase-noise associated with the data subset 335-b. In some cases, the UE may estimate the phase-noise at 330 using a combination of the PTRS 330, the data subset 335-a and the data subset 335-b. Because the data subset 335-b is associated with an intermediate constellation granularity 345-b that is higher than the lowest constellation granularity 345-a of the data subset 335-a, the UE may estimate a more accurate phase-noise associated with the data transmission 325 when estimated the phase-noise associated with the data subset 335-b (e.g., when compared to the phase-noise estimation associated with the data subset 335-a). Additionally, performing the phase-noise correction operation at 320 prior to mapping the symbols associated with the data subset 335-b (e.g., to estimate the phase-noise at 330) may improve an accuracy of the mapping for the data subset 335-b.

At 340, the UE may perform another phase-noise correction operation on the data transmission 325 based on the phase-noise estimated at 330. For example, the UE may correct data within the PTRS 330, the data subset 335-a, the data subset 335-b, and the data subset 335 having the next-highest constellation granularity 345 based on the phase-noise estimated at 330.

The UE may continue to perform iterations of phase-noise estimations associated with each of the data subsets 335 having increasing constellation granularities 345 until at 350, the UE estimates the phase-noise associated with the data transmission 325 using the data subset 335-c that is associated with the highest constellation granularity 345-c. In some cases, the UE may estimate the phase-noise at 350 using a combination of the data subset 335-c, the PTRS 330, the data subset 335-a, and the data subset 335-b. Then at 355 the UE may perform a final phase-noise correction operation on the data transmission 325 based on the phase-noise estimated at 350. That is, based on the estimated phase-noise associated with the data subset 335-c, the UE may correct the phase-noise over the entire data transmission 325.

Figure 4:
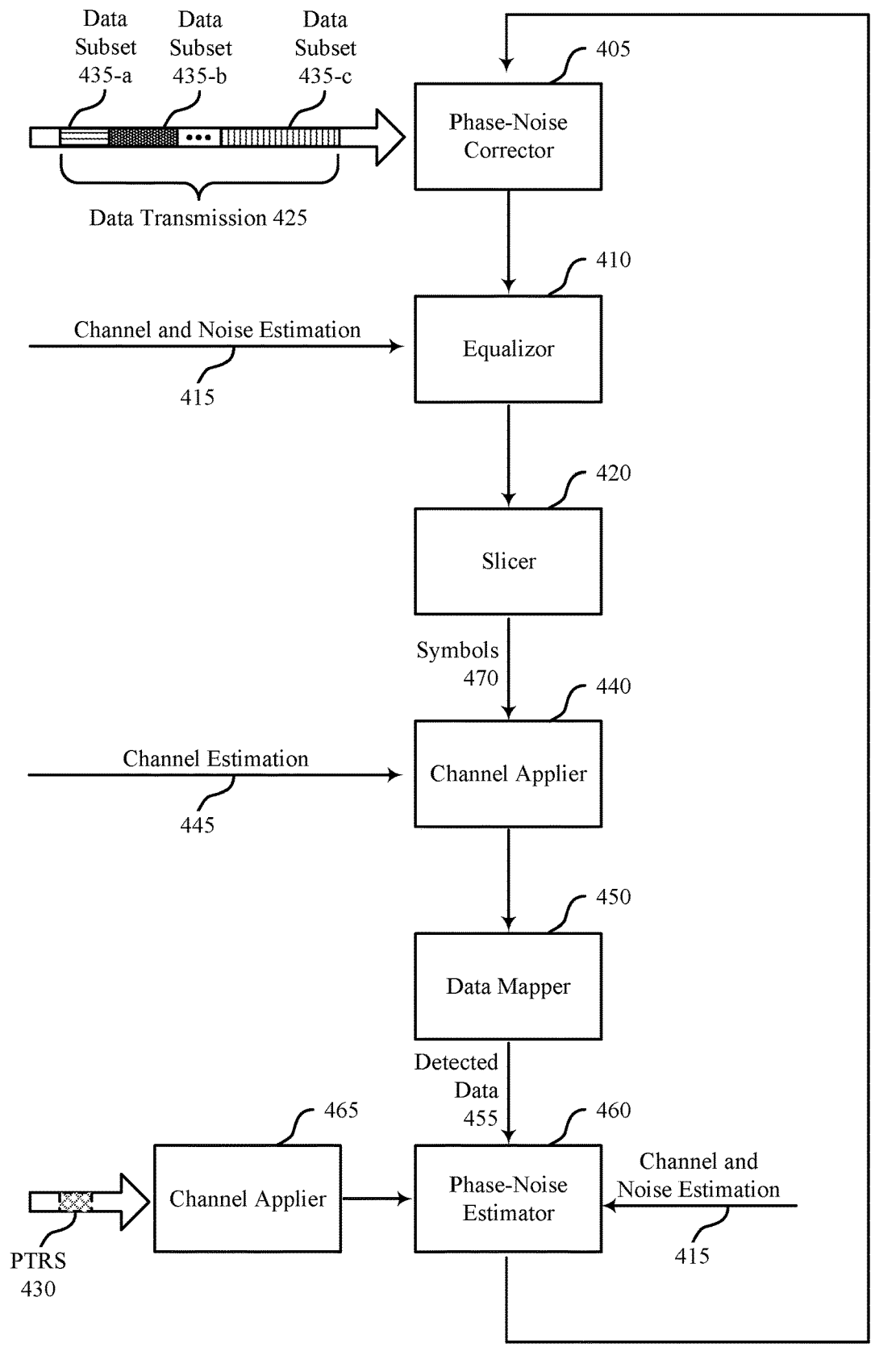
FIG. 4 illustrates an example of a block diagram of a device that supports iterative phase-noise cancellation in accordance with aspects of the present disclosure.

FIG. 4 illustrates an example of a block diagram 400 of a UE that supports iterative phase-noise cancellation in accordance with aspects of the present disclosure. In some examples, the UE may be an example of the UE as described with reference to FIGS. 1 through 3. For example, the block diagram 400 may correspond to a UE that is capable of performing iterative phase-noise correction operations. That is, the UE may receive a data transmission 425 including multiple data subsets 435 each associated with different constellation granularities and may perform the iterative phase-noise correction operations as described herein. The block diagram 400 of the UE may include a phase-noise corrector 405, an equalizer 410, a slicer 420, a channel applier 440, a data mapper 450, a phase-noise estimator 460, and a channel applier 465.

If the data transmission 425 includes a PTRS 430, on a first iteration of an iterative phase-noise correction operation associated with a data transmission 425, the phase-noise estimator 460 may estimate a portion of the phase-noise associated with the data transmission 425 using the PTRS 430. For example, the channel applier 465 may receive the PTRS 430 and communicate the PTRS 430 to the phase-noise estimator 460. Then, the phase-noise estimator 460 may use an algorithm (e.g., a least-squares algorithm, a linear minimum mean squared-error algorithm) to estimate a portion of the phase-noise associated with the data transmission 425 based on the PTRS 430.

The phase-noise corrector 405 may cancel the estimated phase-noise (e.g., determined by the phase-noise estimator 460 based on the PTRS 430) from the data transmission. For example, the phase-noise corrector 405 may cancel the estimated phase-noise from the PTRS 430 and a data subset 435 having the next-highest constellation granularity in the data transmission 425 (e.g., using some inter-carrier interference cancellation in frequency domain). In some cases, performing the phase-noise correction operation (e.g., by cancelling the estimated phase-noise from the OFDM) may improve an error vector magnitude (EVM) associated with the data transmission 425.

The equalizer 410 may perform an equalization on the entire OFDM (e.g., including the data transmission 425) based on the channel and noise estimation 415. Then, the slicer 420 and data mapper 450 may detect the data subset 435-a (e.g., the lowest constellation portion of the data transmission 425). That is, the slicer 420 may process the data subset 435-a to generate the symbols 470, the channel applier 440 may apply the channel estimation 445 to the symbols 470, and the data mapper 450 may detect the data within the data subset 435-a. In some cases, improving the EVM of the data subset 435-a prior to the slicer 420 detecting the data subset 435-a may allow for the detection of the data subset 435-a. That is, the slicer 420 may be unable to detect the data within the data subset 435-a prior to performing the phase-noise correction operation due to the EVM being too large.

The phase-noise estimator 460 may receive the detected data 455 from the data mapper 450 and estimate the phase-noise associated with the detected data 455. That is, the phase-noise estimator 460 may use the PTRS 430 in combination with the detected data 455 (e.g., from the data subset 435-a) to re-estimate a phase-noise of the data transmission 425.

The phase-noise corrector 405 may rely on the re-estimated phase-noise to improve a cancellation of the phase-noise from all of the OFDM symbol containing the data transmission 425, which may further improve the EVM. As described above, the improved EVM may further improve a UEs ability to detect a next data subset 435 (e.g., that has a higher constellation granularity). The UE may perform this process iteratively up to a point where each data subset 435 of the data transmission 425 is used together (e.g., with the PTRS 430) by the phase-noise estimator 460 and phase-noise corrector 405 to estimate and cancel the estimated phase-noise from the data transmission 425.

Figure 5:
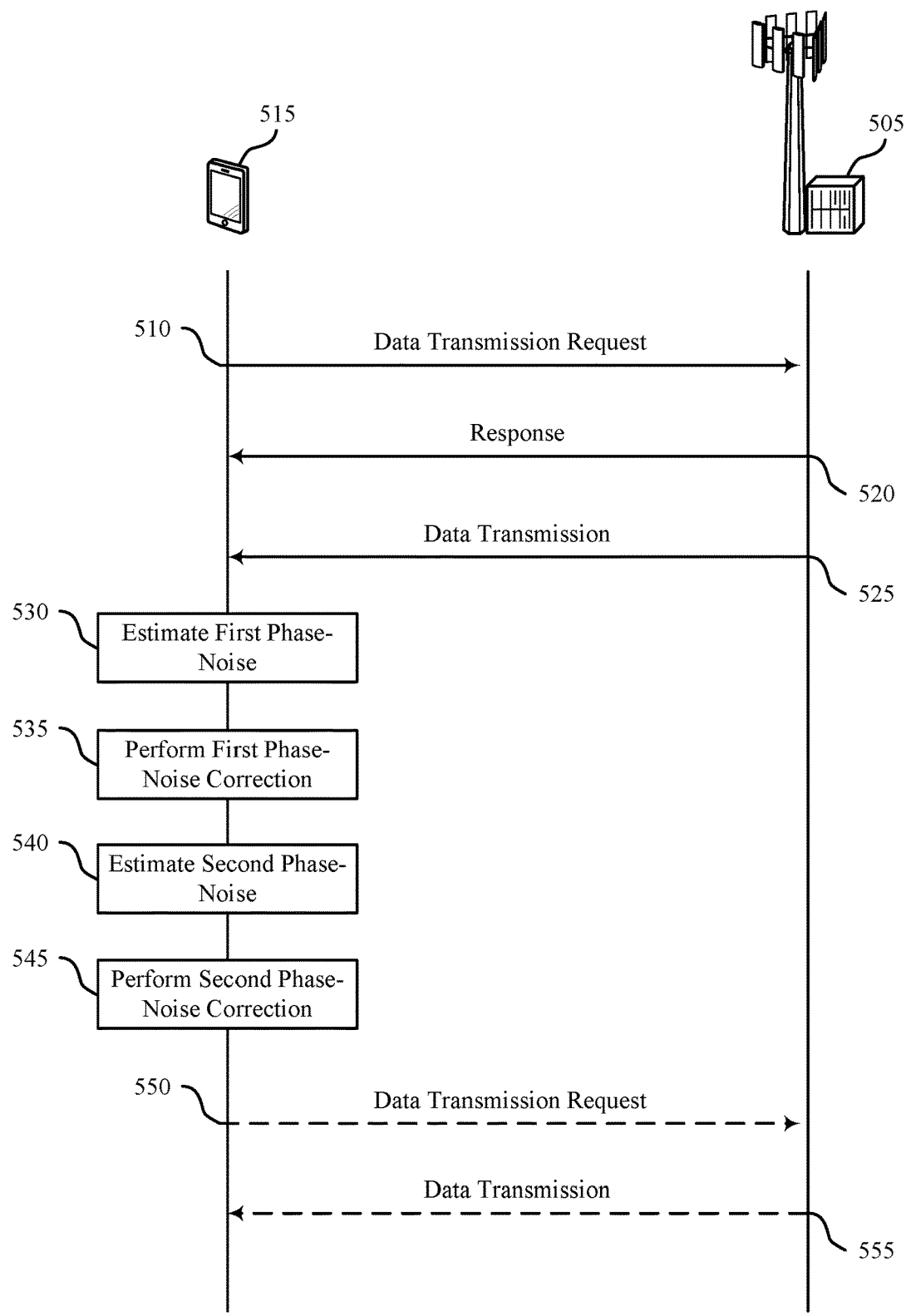
FIG. 5 illustrates an example of a process flow that supports iterative phase-noise cancellation in accordance with aspects of the present disclosure.

FIG. 5 illustrates an example of a process flow 500 that supports iterative phase-noise cancellation in accordance with aspects of the present disclosure. In some examples, the process flow 500 may implement aspects of FIGS. 1 through 4. For example, the process flow 500 may include base station 505 and UE 515, which may be examples of a base station and a UE as described with reference to FIGS. 1 through 4.

At 510, the UE 515 may transmit, to the base station 505, a request for a data transmission including multiple subsets of data, each subset of data associated with a different constellation granularities. For example, the UE 515 may determine that an SNR associated with a transmission received from the base station 505 fails to meet a threshold and in response, transmit the request for the data transmission at 510. Additionally, the UE 515 may transmit the request at 510 base on a capability of the UE 515 to decode data transmissions including multiple subsets of data each associated with the different constellation granularities.

At 520, the base station 505 may transmit, to the UE 515, a response to the request indicating that the data transmission includes multiple subsets of data and each subset of data is associated with the different constellation granularities.

At 525, the base station 505 may transmit, to the UE 515, the data transmission including a first subset of data associated with a first constellation granularity and a second subset of data associated with a second constellation granularity. In some cases, the data transmission may additionally include a PTRS.

At 530, the UE 515 may begin an iterative error cancellation process on the data transmission received at 525. For example, the UE 515 may estimate a first phase-noise associated with the first subset of data based on decoding the first subset of data.

In cases that the data transmission includes a PTRS, the UE 515 may estimate a phase-noise associated with the PTRS and perform an error correction operation on the data transmission based on the estimated phase-noise associated with the PTRS prior to estimating the phase-noise associated with the first subset of data.

At 535, the UE 515 may perform a first phase-noise correction operation on the data transmission based on the estimated first phase-noise.

At 540, the UE 515 may estimate, based on performing the first phase-noise correction operation on the data transmission at 535, a second phase-noise associated with the second subset of data. That is, the UE 515 may estimate the second phase-noise of the data transmission based on estimating a phase noise in the PTRS (e.g., if the data transmission includes the PTRS) and the first subset of data.

At 545, the UE 515 may perform a second phase-noise correction operation on the data transmission based on the second estimated phase-noise.

At 550, the UE 515 may optionally transmit a request for a second data transmission including a single subset of data associated with a single constellation granularity. For example, the UE 515 may determine that an SNR associated with a data transmission received earlier from the base station 505 satisfies a threshold.

In response to receiving the request at 550, at 555 the base station 505 may optionally transmit a data transmission including a single subset of data associated with a single constellation granularity.

Figure 6:
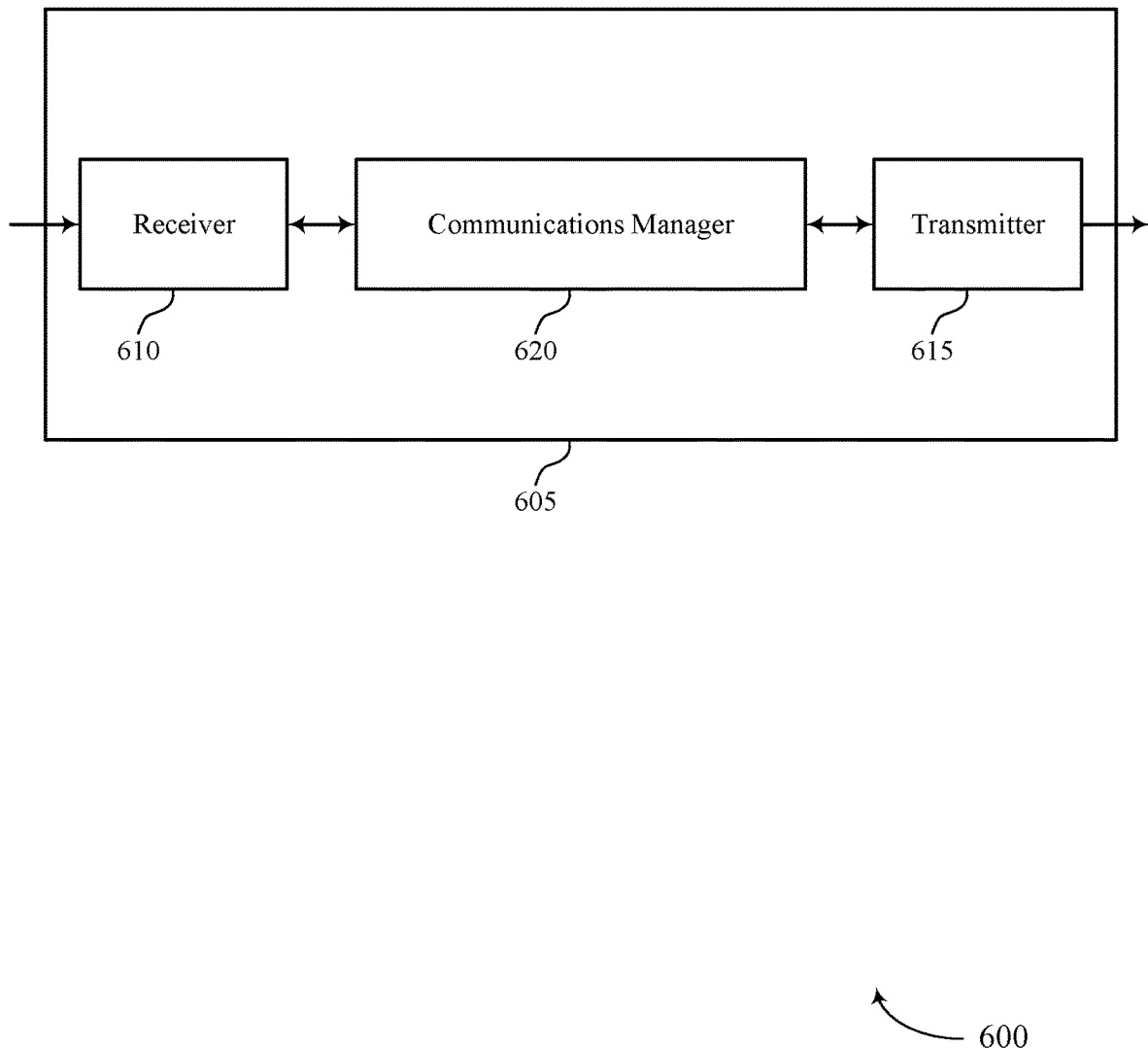
FIGS. 6 and 7 show block diagrams of devices that support iterative phase-noise cancellation in accordance with aspects of the present disclosure.

FIG. 6 shows a block diagram 600 of a device 605 that supports iterative phase-noise cancellation in accordance with aspects of the present disclosure. The device 605 may be an example of aspects of a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to perform the iterative phase-noise cancellation features discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to iterative phase-noise cancellation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to iterative phase-noise cancellation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of iterative phase-noise cancellation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting, to a base station, a request for a data transmission including multiple subsets of data, each subset of data associated with a different constellation granularity. The communications manager 620 may be configured as or otherwise support a means for receiving, from the base station in response to the request, the data transmission including a first subset of data associated with a first constellation granularity and a second subset of data associated with a second constellation granularity. The communications manager 620 may be configured as or otherwise support a means for estimating a first phase-noise associated with the first subset of data based on decoding the first subset of data. The communications manager 620 may be configured as or otherwise support a means for estimating, based on estimating the first phase-noise associated with the first subset of data, a second phase-noise associated with the second subset of data.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources.

Figure 7:
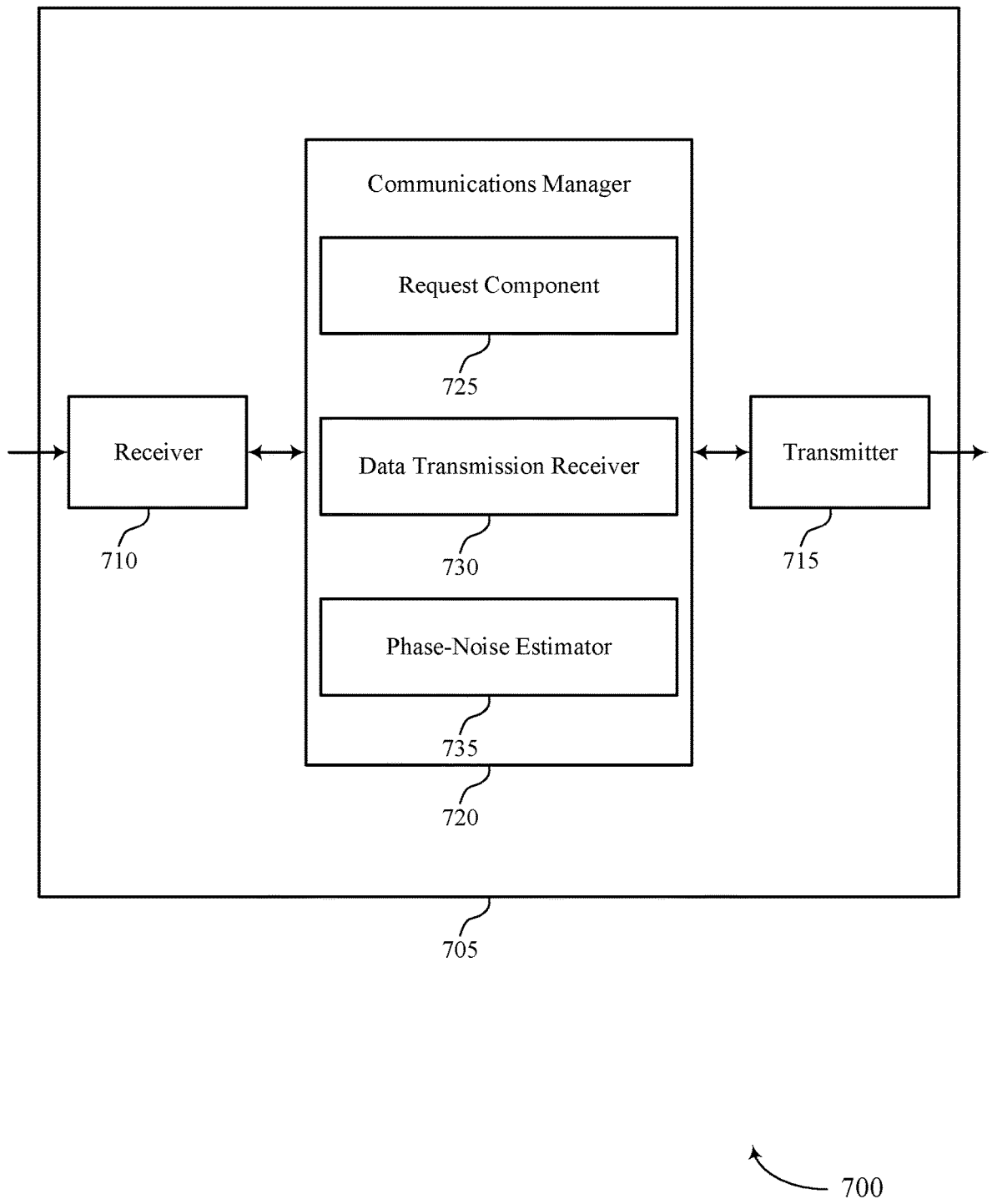

FIG. 7 shows a block diagram 700 of a device 705 that supports iterative phase-noise cancellation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to iterative phase-noise cancellation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to iterative phase-noise cancellation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of iterative phase-noise cancellation as described herein. For example, the communications manager 720 may include a request component 725, a data transmission receiver 730, a phase-noise estimator 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The request component 725 may be configured as or otherwise support a means for transmitting, to a base station, a request for a data transmission including multiple subsets of data, each subset of data associated with a different constellation granularity. The data transmission receiver 730 may be configured as or otherwise support a means for receiving, from the base station in response to the request, the data transmission including a first subset of data associated with a first constellation granularity and a second subset of data associated with a second constellation granularity. The phase-noise estimator 735 may be configured as or otherwise support a means for estimating a first phase-noise associated with the first subset of data based on decoding the first subset of data. The phase-noise estimator 735 may be configured as or otherwise support a means for estimating, based on estimating the first phase-noise associated with the first subset of data, a second phase-noise associated with the second subset of data.

Figure 8:
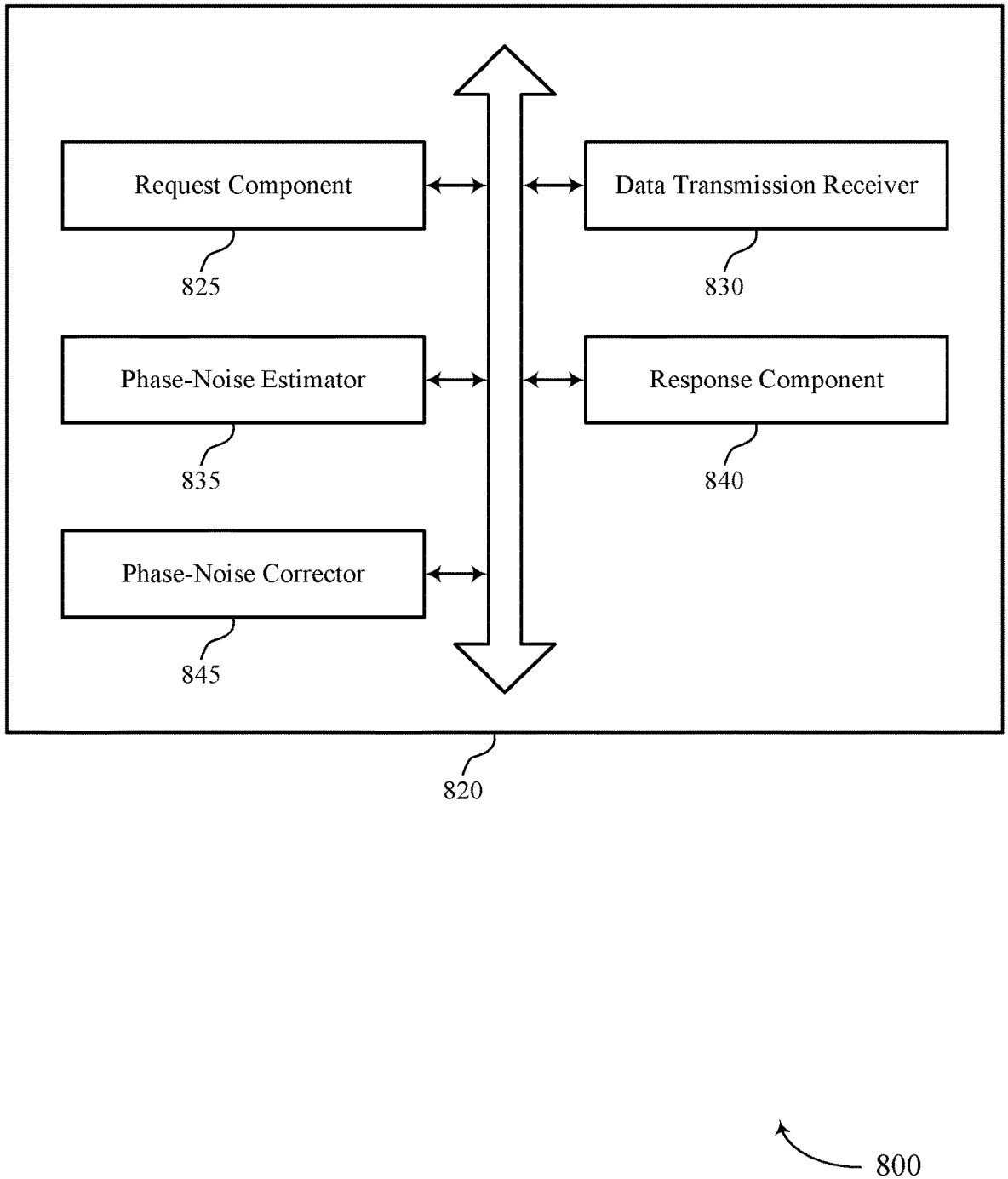
FIG. 8 shows a block diagram of a communications manager that supports iterative phase-noise cancellation in accordance with aspects of the present disclosure.

In some cases, the request component 725, the data transmission receiver 730, and the phase-noise estimator 735 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the request component 725, the data transmission receiver 730, and the phase-noise estimator 735 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device FIG. 8 shows a block diagram 800 of a communications manager 820 that supports iterative phase-noise cancellation in accordance with aspects of the present disclosure. The communications manager 820 may be an example of aspects of a communications manager 620, a communications manager 720, or both, as described herein. The communications manager 820, or various components thereof, may be an example of means for performing various aspects of iterative phase-noise cancellation as described herein. For example, the communications manager 820 may include a request component 825, a data transmission receiver 830, a phase-noise estimator 835, a response component 840, a phase-noise corrector 845, or any combination thereof. Each of these components may communicate, directly or indirectly, with one another (e.g., via one or more buses).

The communications manager 820 may support wireless communication at a UE in accordance with examples as disclosed herein. The request component 825 may be configured as or otherwise support a means for transmitting, to a base station, a request for a data transmission including multiple subsets of data, each subset of data associated with a different constellation granularity. The data transmission receiver 830 may be configured as or otherwise support a means for receiving, from the base station in response to the request, the data transmission including a first subset of data associated with a first constellation granularity and a second subset of data associated with a second constellation granularity. The phase-noise estimator 835 may be configured as or otherwise support a means for estimating a first phase-noise associated with the first subset of data based on decoding the first subset of data. In some examples, the phase-noise estimator 835 may be configured as or otherwise support a means for estimating, based on estimating the first phase-noise associated with the first subset of data, a second phase-noise associated with the second subset of data.

In some examples, the response component 840 may be configured as or otherwise support a means for receiving, from the base station, a response to the request indicating that the data transmission includes multiple subsets of data and each subset of data is associated with the different constellation granularities, where receiving the data transmission is based on receiving the response.

In some examples, the phase-noise corrector 845 may be configured as or otherwise support a means for performing a first phase-noise correction operation on the data transmission based on the estimated first phase-noise, where estimating the second phase-noise is based on performing the first phase-noise correction operation.

In some examples, the phase-noise corrector 845 may be configured as or otherwise support a means for performing a second phase-noise correction operation on the data transmission based on the second estimated phase-noise.

In some examples, the request component 825 may be configured as or otherwise support a means for determining that an SNR associated with a transmission received from the base station fails to meet a threshold, where transmitting the request is based on the determining.

In some examples, the threshold is based on a constellation granularity associated with the transmission received from the base station.

In some examples, transmitting the request is based on a capability of the UE to decode data transmissions including multiple subsets of data each associated with the different constellation granularities.

In some examples, the data transmission further includes a phase tracking reference signal. In some examples, estimating the second phase-noise associated with the second subset of data is further based on an estimated third phase-noise associated with the phase tracking reference signal.

In some examples, the request component 825 may be configured as or otherwise support a means for transmitting, to the base station after receiving the data transmission, a second request for a second data transmission including a single subset of data associated with a single constellation granularity. In some examples, the data transmission receiver 830 may be configured as or otherwise support a means for receiving, from the base station based on transmitting the second request, the second data transmission including the single subset of data associated with the single constellation granularity.

In some examples, the request component 825 may be configured as or otherwise support a means for determining that an SNR associated with the data transmission satisfies a threshold, where transmitting the second request is based on the determining.

In some examples, the response component 840 may be configured as or otherwise support a means for receiving, from the base station, a response to the second request indicating that the second data transmission includes the single subset of data associated with the single constellation granularity, where receiving the second data transmission is based on receiving the response.

In some examples, the first constellation granularity is lower than the second constellation granularity. In some examples, the first subset of data spans a smaller quantity of resource elements than the second subset of data.

In some examples, the first subset of data spans a first set of time resources and a first set of frequency resources. In some examples, the second subset of data spans the first set of time resources and a second set of frequency resources.

In some examples, the first set of frequency resources are lower in frequency than the second set of frequency resources. In some examples, the first constellation granularity is lower than the second constellation granularity.

In some cases, the request component 825, the data transmission receiver 830, the phase-noise estimator 835, the response component 840, and the phase-noise corrector 845 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the request component 825, the data transmission receiver 830, the phase-noise estimator 835, the response component 840, and the phase-noise corrector 845 discussed herein.

Figure 9:
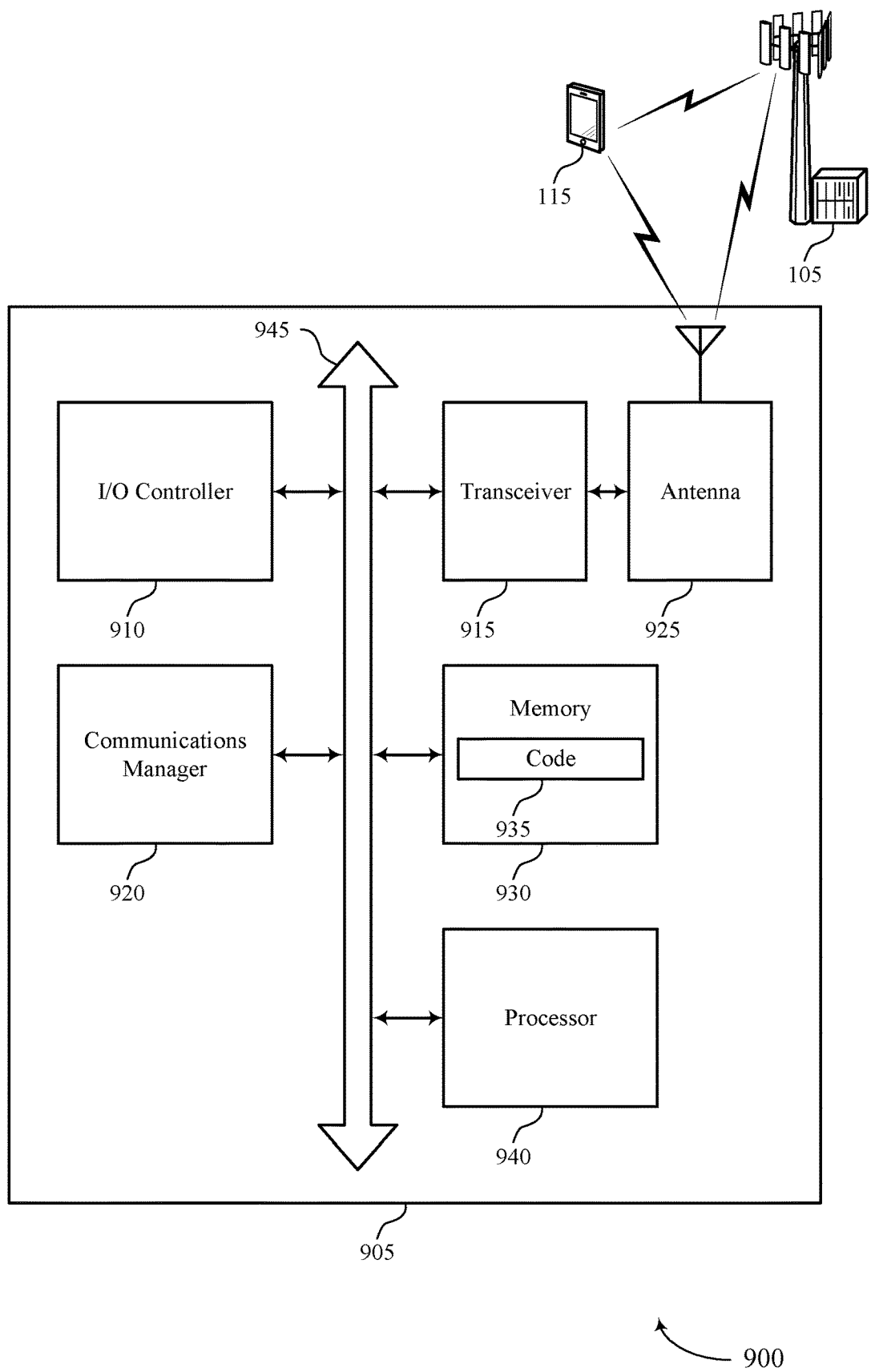
FIG. 9 shows a diagram of a system including a device that supports iterative phase-noise cancellation in accordance with aspects of the present disclosure.

FIG. 9 shows a diagram of a system 900 including a device 905 that supports iterative phase-noise cancellation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925.

The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting iterative phase-noise cancellation). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, to a base station, a request for a data transmission including multiple subsets of data, each subset of data associated with a different constellation granularity. The communications manager 920 may be configured as or otherwise support a means for receiving, from the base station in response to the request, the data transmission including a first subset of data associated with a first constellation granularity and a second subset of data associated with a second constellation granularity. The communications manager 920 may be configured as or otherwise support a means for estimating a first phase-noise associated with the first subset of data based on decoding the first subset of data. The communications manager 920 may be configured as or otherwise support a means for estimating, based on estimating the first phase-noise associated with the first subset of data, a second phase-noise associated with the second subset of data.

By including or configuring the communications manager 920 in accordance with examples as described herein, the device 905 may support techniques for improved communication reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of iterative phase-noise cancellation as described herein, or the processor 940 and the memory 930 may be otherwise configured to perform or support such operations.

Figure 10:
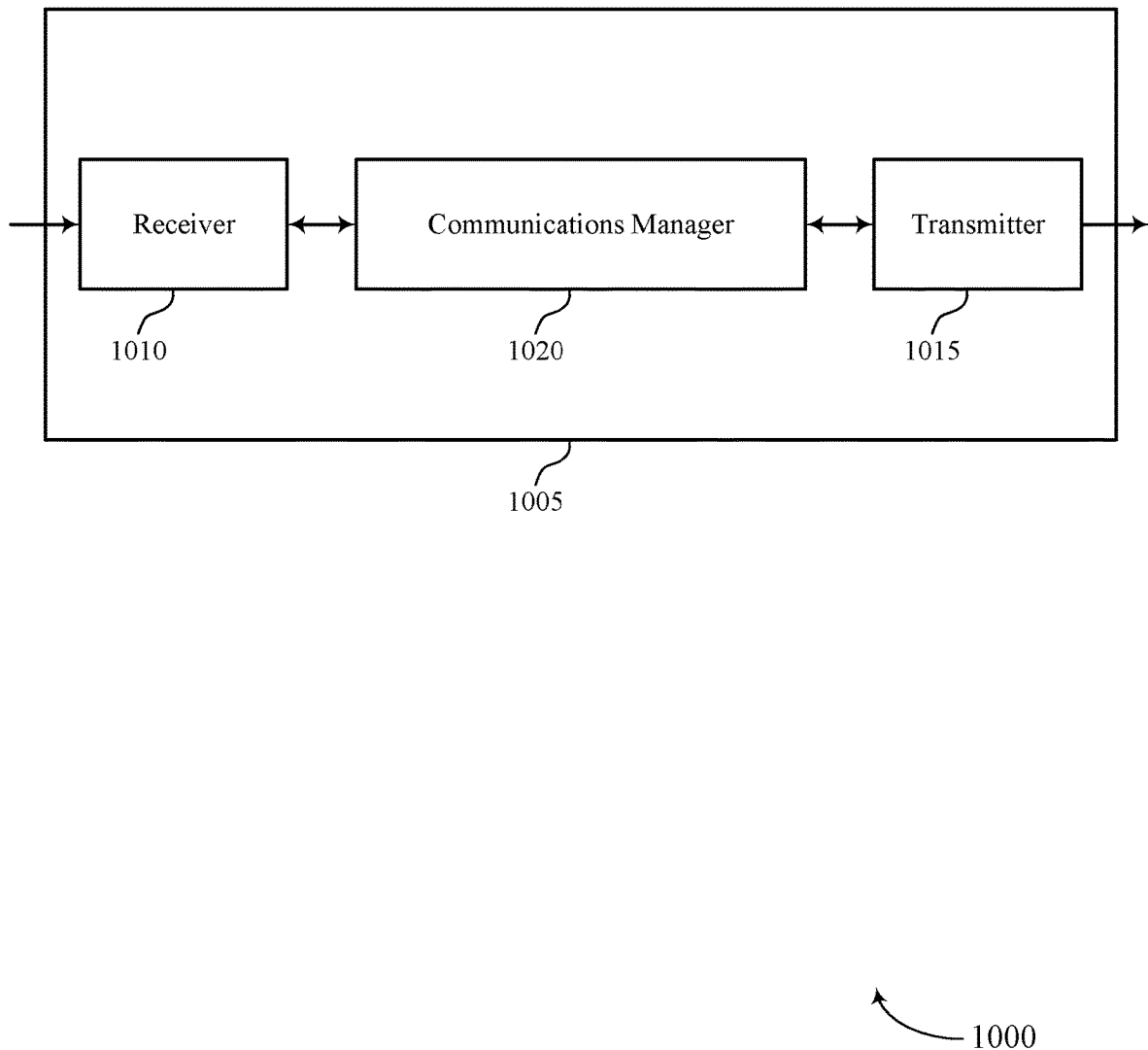
FIGS. 10 and 11 show block diagrams of devices that support iterative phase-noise cancellation in accordance with aspects of the present disclosure.

FIG. 10 shows a block diagram 1000 of a device 1005 that supports iterative phase-noise cancellation in accordance with aspects of the present disclosure. The device 1005 may be an example of aspects of a base station 105 as described herein. The device 1005 may include a receiver 1010, a transmitter 1015, and a communications manager 1020. The device 1005 may also one or more processors, memory coupled with the one or more processors, and instructions stored in the memory that are executable by the one or more processors to enable the one or more processors to perform the multiple constellation granularity features discussed herein. Each of these components may be in communication with one another (e.g., via one or more buses).

The receiver 1010 may provide a means for receiving information such as packets, user data, control information, or any combination thereof associated with various information channels (e.g., control channels, data channels, information channels related to iterative phase-noise cancellation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to iterative phase-noise cancellation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of iterative phase-noise cancellation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for receiving, from a UE, a request for a data transmission including multiple subsets of data, each subset of data associated with a different constellation granularity. The communications manager 1020 may be configured as or otherwise support a means for encoding, based on receiving the request, a first subset of data in the data transmission using a first constellation granularity and a second subset of data in the data transmission using a second constellation granularity. The communications manager 1020 may be configured as or otherwise support a means for transmitting, to the UE, the data transmission including the first subset of data associated with the first constellation granularity and the second subset of data associated with the second constellation granularity.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
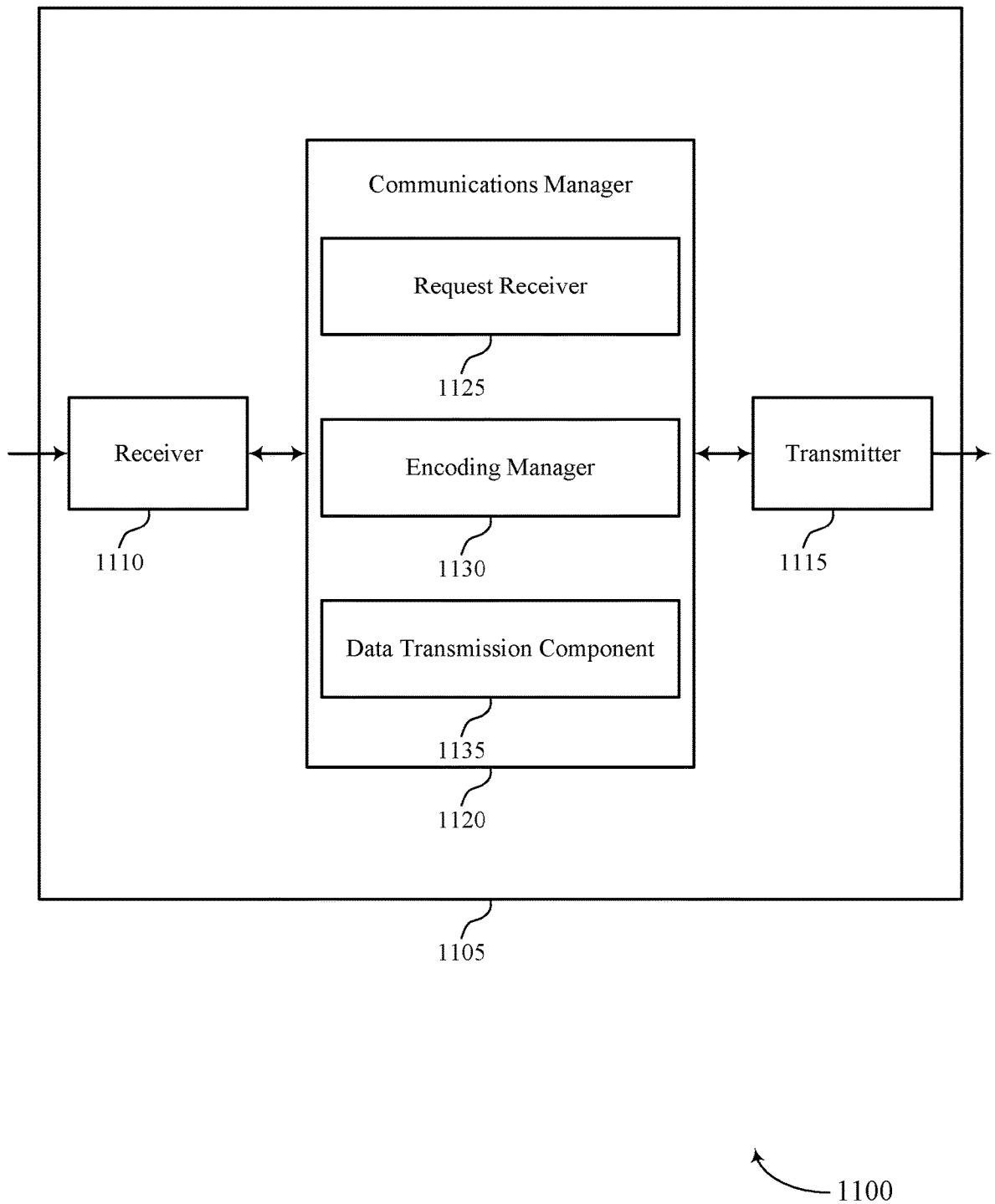

FIG. 11 shows a block diagram 1100 of a device 1105 that supports iterative phase-noise cancellation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to iterative phase-noise cancellation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to iterative phase-noise cancellation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of iterative phase-noise cancellation as described herein. For example, the communications manager 1120 may include a request receiver 1125, an encoding manager 1130, a data transmission component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The request receiver 1125 may be configured as or otherwise support a means for receiving, from a UE, a request for a data transmission including multiple subsets of data, each subset of data associated with a different constellation granularity. The encoding manager 1130 may be configured as or otherwise support a means for encoding, based on receiving the request, a first subset of data in the data transmission using a first constellation granularity and a second subset of data in the data transmission using a second constellation granularity. The data transmission component 1135 may be configured as or otherwise support a means for transmitting, to the UE, the data transmission including the first subset of data associated with the first constellation granularity and the second subset of data associated with the second constellation granularity.

In some cases, the request receiver 1125, the encoding manager 1130, the data transmission component 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the request receiver 1125, the encoding manager 1130, the data transmission component 1135 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
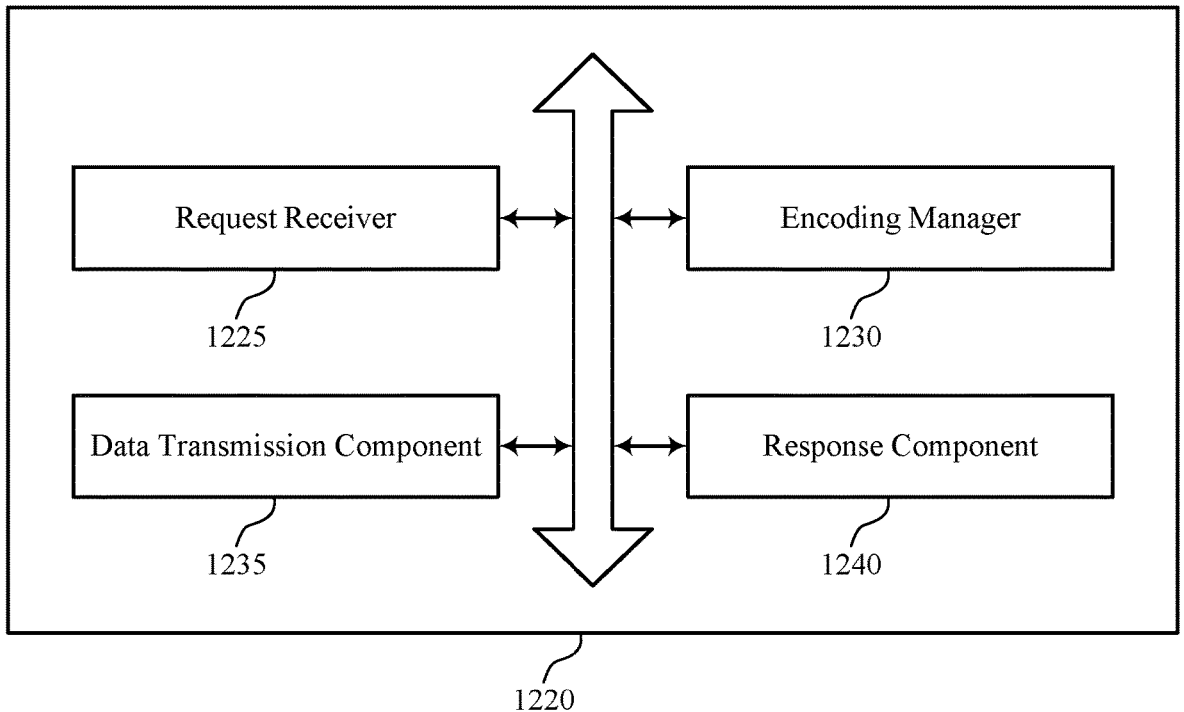
FIG. 12 shows a block diagram of a communications manager that supports iterative phase-noise cancellation in accordance with aspects of the present disclosure.

FIG. 12 shows a block diagram 1200 of a communications manager 1220 that supports iterative phase-noise cancellation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of iterative phase-noise cancellation as described herein. For example, the communications manager 1220 may include a request receiver 1225, an encoding manager 1230, a data transmission component 1235, a response component 1240, or any combination thereof. Each of these components may communicate, directly or indirectly, with one another (e.g., via one or more buses).

The communications manager 1220 may support wireless communication at a base station in accordance with examples as disclosed herein. The request receiver 1225 may be configured as or otherwise support a means for receiving, from a UE, a request for a data transmission including multiple subsets of data, each subset of data associated with a different constellation granularity. The encoding manager 1230 may be configured as or otherwise support a means for encoding, based on receiving the request, a first subset of data in the data transmission using a first constellation granularity and a second subset of data in the data transmission using a second constellation granularity. The data transmission component 1235 may be configured as or otherwise support a means for transmitting, to the UE, the data transmission including the first subset of data associated with the first constellation granularity and the second subset of data associated with the second constellation granularity.

In some examples, the response component 1240 may be configured as or otherwise support a means for transmitting, to the UE, a response to the request indicating that the data transmission includes multiple subsets of data and each subset of data is associated with the different constellation granularities, where the encoding is based on transmitting the response.

In some examples, the encoding manager 1230 may be configured as or otherwise support a means for encoding a phase tracking reference signal in the data transmission using a third constellation granularity, where transmitting the data transmission is based on encoding the phase tracking reference signal.

In some examples, the request receiver 1225 may be configured as or otherwise support a means for receiving, from the UE after transmitting the data transmission, a second request for a second data transmission including a single subset of data associated with a single constellation granularity. In some examples, the encoding manager 1230 may be configured as or otherwise support a means for encoding the single subset of data using the single constellation granularity based on receiving the second request. In some examples, the data transmission component 1235 may be configured as or otherwise support a means for transmitting, to the UE, the second data transmission including the single subset of data associated with the single constellation granularity.

In some examples, the response component 1240 may be configured as or otherwise support a means for transmitting, to the UE, a response to the second request indicating that the second data transmission includes the single subset of data associated with the single constellation granularity, where transmitting the second data transmission is based on transmitting the response.

In some examples, the first constellation granularity is lower than the second constellation granularity. In some examples, the first subset of data spans a smaller quantity of resource elements than the second subset of data.

In some examples, the first subset of data spans a first set of time resources and a first set of frequency resources. In some examples, the second subset of data spans the first set of time resources and a second set of frequency resources.

In some examples, the first set of frequency resources are lower in frequency than the second set of frequency resources. In some examples, the first constellation granularity is lower than the second constellation granularity.

In some cases, the request receiver 1225, the encoding manager 1230, the data transmission component 1235, and the response component 1240 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the request receiver 1225, the encoding manager 1230, the data transmission component 1235, and the response component 1240 discussed herein.

Figure 13:
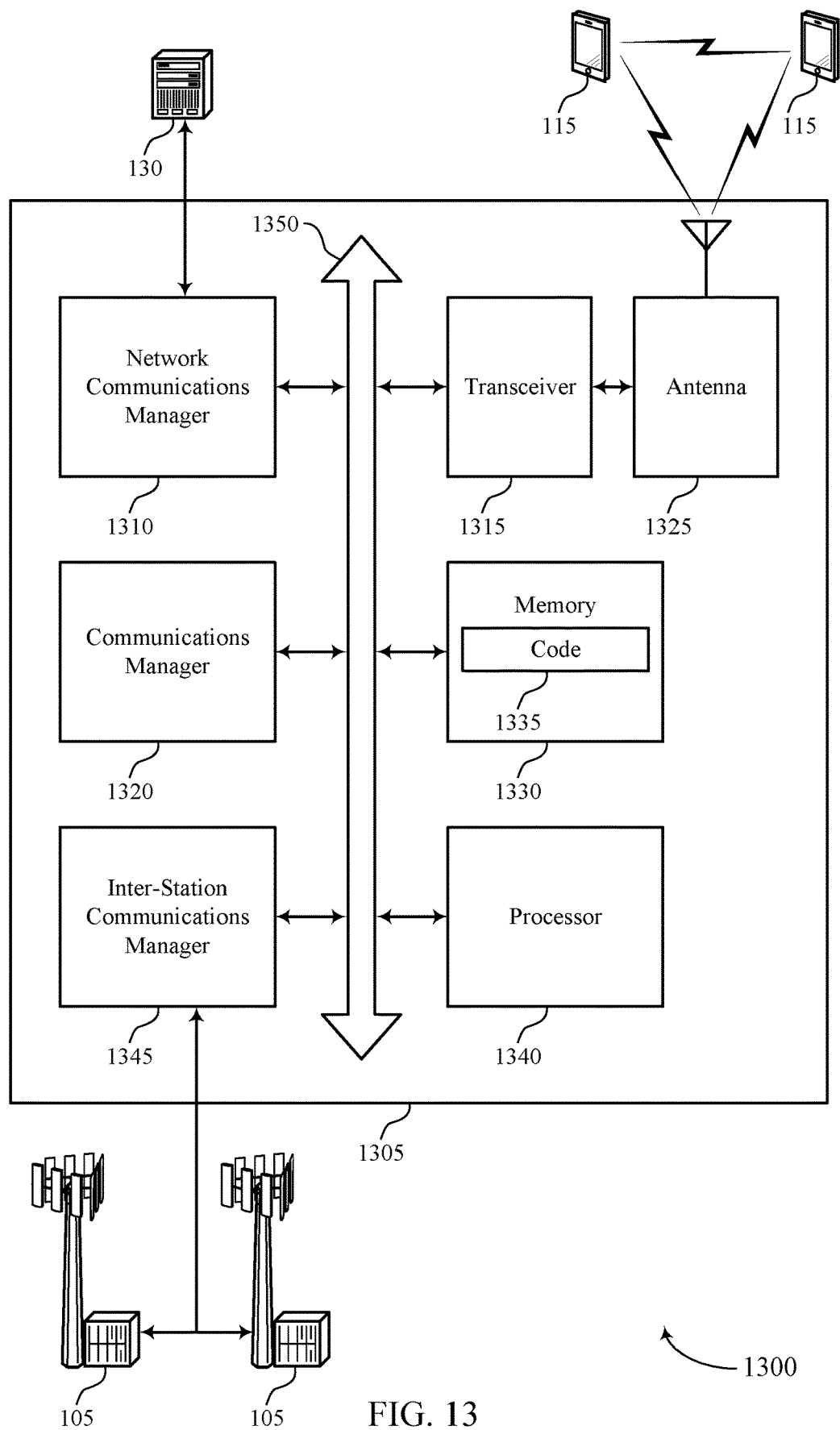
FIG. 13 shows a diagram of a system including a device that supports iterative phase-noise cancellation in accordance with aspects of the present disclosure.

FIG. 13 shows a diagram of a system 1300 including a device 1305 that supports iterative phase-noise cancellation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting iterative phase-noise cancellation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for receiving, from a UE, a request for a data transmission including multiple subsets of data, each subset of data associated with a different constellation granularity. The communications manager 1320 may be configured as or otherwise support a means for encoding, based on receiving the request, a first subset of data in the data transmission using a first constellation granularity and a second subset of data in the data transmission using a second constellation granularity. The communications manager 1320 may be configured as or otherwise support a means for transmitting, to the UE, the data transmission including the first subset of data associated with the first constellation granularity and the second subset of data associated with the second constellation granularity.

By including or configuring the communications manager 1320 in accordance with examples as described herein, the device 1305 may support techniques for improved communication reliability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager

1320 may be supported by or performed by the processor 1340, the memory 1330, the code 1335, or any combination thereof. For example, the code 1335 may include instructions executable by the processor 1340 to cause the device 1305 to perform various aspects of iterative phase-noise cancellation as described herein, or the processor 1340 and the memory 1330 may be otherwise configured to perform or support such operations.

Figure 14:
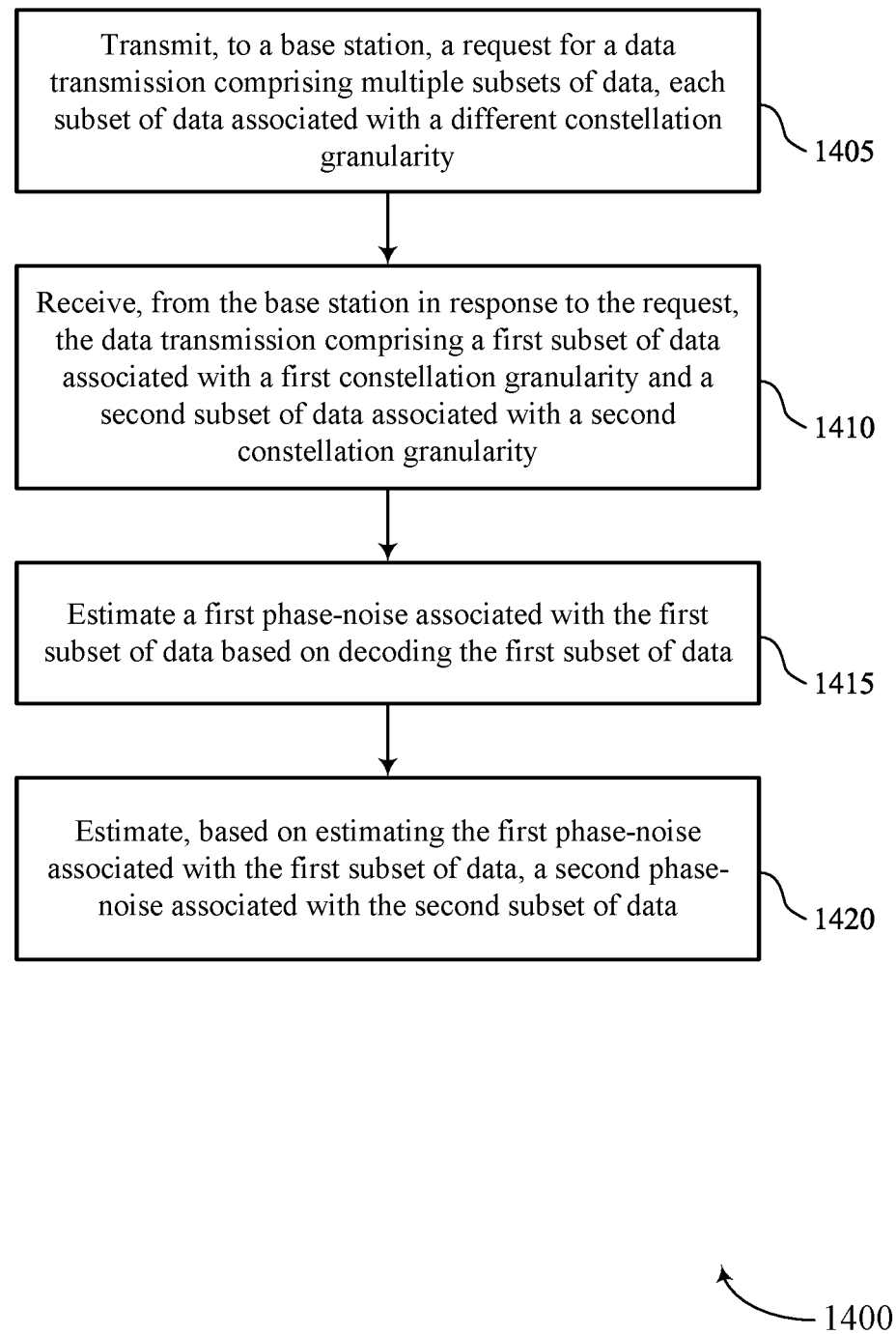
FIGS. 14 through 18 show flowcharts illustrating methods that support iterative phase-noise cancellation in accordance with aspects of the present disclosure.

FIG. 14 shows a flowchart illustrating a method 1400 that supports iterative phase-noise cancellation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a request for a data transmission including multiple subsets of data, each subset of data associated with a different constellation granularity. The operations of 1405 may be performed in accordance with examples as disclosed herein. In some examples, aspects of the operations of 1405 may be performed by a request component 825 as described with reference to FIG. 8.

At 1410, the method may include receiving, from the base station in response to the request, the data transmission including a first subset of data associated with a first constellation granularity and a second subset of data associated with a second constellation granularity. The operations of 1410 may be performed in accordance with examples as disclosed herein. In some examples, aspects of the operations of 1410 may be performed by a data transmission receiver 830 as described with reference to FIG. 8.

At 1415, the method may include estimating a first phase-noise associated with the first subset of data based on decoding the first subset of data. The operations of 1415 may be performed in accordance with examples as disclosed herein. In some examples, aspects of the operations of 1415 may be performed by a phase-noise estimator 835 as described with reference to FIG. 8.

At 1420, the method may include estimating, based on estimating the first phase-noise associated with the first subset of data, a second phase-noise associated with the second subset of data. The operations of 1420 may be performed in accordance with examples as disclosed herein. In some examples, aspects of the operations of 1420 may be performed by a phase-noise estimator 835 as described with reference to FIG. 8.

Figure 15:
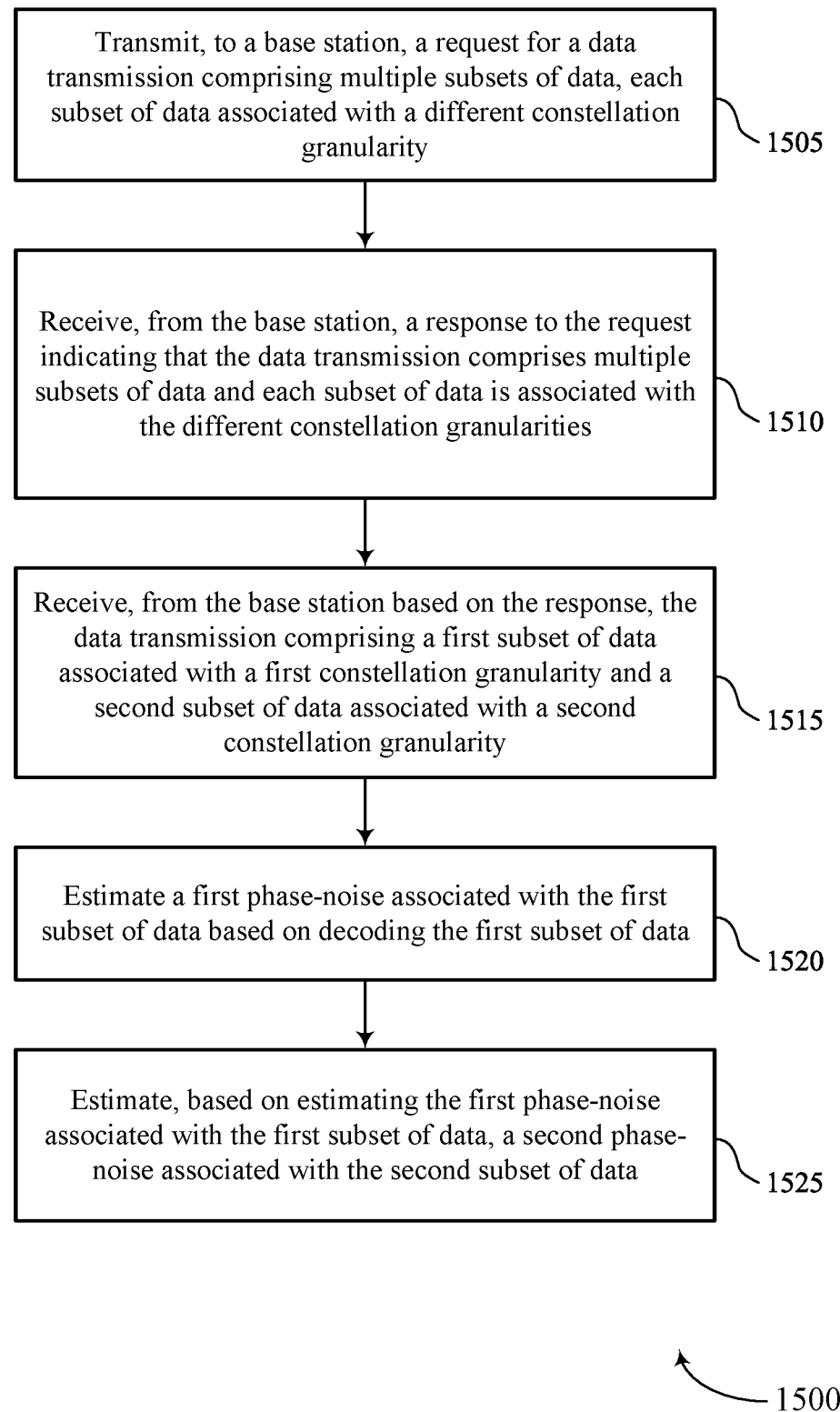

FIG. 15 shows a flowchart illustrating a method 1500 that supports iterative phase-noise cancellation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a request for a data transmission including multiple subsets of data, each subset of data associated with a different constellation granularity. The operations of 1505 may be performed in accordance with examples as disclosed herein. In some examples, aspects of the operations of 1505 may be performed by a request component 825 as described with reference to FIG. 8.

At 1510, the method may include receiving, from the base station, a response to the request indicating that the data transmission includes multiple subsets of data and each subset of data is associated with the different constellation granularities. The operations of 1510 may be performed in accordance with examples as disclosed herein. In some examples, aspects of the operations of 1510 may be performed by a response component 840 as described with reference to FIG. 8.

At 1515, the method may include receiving, from the base station based on receiving the response, the data transmission including a first subset of data associated with a first constellation granularity and a second subset of data associated with a second constellation granularity. The operations of 1515 may be performed in accordance with examples as disclosed herein. In some examples, aspects of the operations of 1515 may be performed by a data transmission receiver 830 as described with reference to FIG. 8.

At 1520, the method may include estimating a first phase-noise associated with the first subset of data based on decoding the first subset of data. The operations of 1520 may be performed in accordance with examples as disclosed herein. In some examples, aspects of the operations of 1520 may be performed by a phase-noise estimator 835 as described with reference to FIG. 8.

At 1525, the method may include estimating, based on estimating the first phase-noise associated with the first subset of data, a second phase-noise associated with the second subset of data. The operations of 1525 may be performed in accordance with examples as disclosed herein. In some examples, aspects of the operations of 1525 may be performed by a phase-noise estimator 835 as described with reference to FIG. 8.

Figure 16:
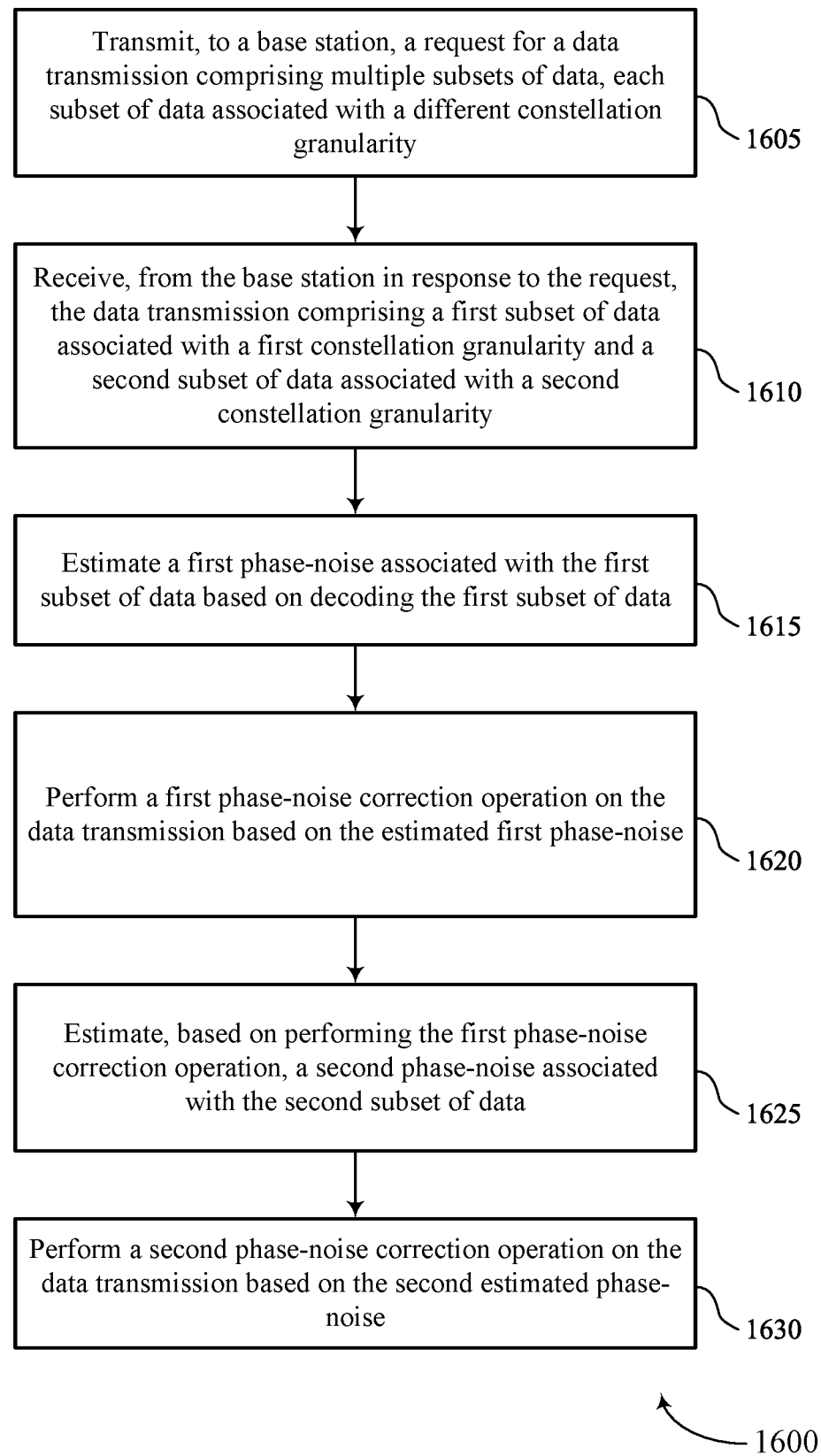

FIG. 16 shows a flowchart illustrating a method 1600 that supports iterative phase-noise cancellation in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a request for a data transmission including multiple subsets of data, each subset of data associated with a different constellation granularity. The operations of 1605 may be performed in accordance with examples as disclosed herein. In some examples, aspects of the operations of 1605 may be performed by a request component 825 as described with reference to FIG. 8.

At 1610, the method may include receiving, from the base station in response to the request, the data transmission including a first subset of data associated with a first constellation granularity and a second subset of data associated with a second constellation granularity. The operations of 1610 may be performed in accordance with examples as disclosed herein. In some examples, aspects of the operations of 1610 may be performed by a data transmission receiver 830 as described with reference to FIG. 8.

At 1615, the method may include estimating a first phase-noise associated with the first subset of data based on decoding the first subset of data. The operations of 1615 may be performed in accordance with examples as disclosed herein. In some examples, aspects of the operations of 1615 may be performed by a phase-noise estimator 835 as described with reference to FIG. 8.

At 1620, the method may include performing a first phase-noise correction operation on the data transmission based on the estimated first phase-noise. The operations of 1620 may be performed in accordance with examples as disclosed herein. In some examples, aspects of the operations of 1620 may be performed by a phase-noise corrector 845 as described with reference to FIG. 8.

At 1625, the method may include estimating, based on performing the first phase-noise correction operation, a second phase-noise associated with the second subset of data. The operations of 1625 may be performed in accordance with examples as disclosed herein. In some examples, aspects of the operations of 1625 may be performed by a phase-noise estimator 835 as described with reference to FIG. 8.

At 1630, the method may include performing a second phase-noise correction operation on the data transmission based on the second estimated phase-noise. The operations of 1630 may be performed in accordance with examples as disclosed herein. In some examples, aspects of the operations of 1630 may be performed by a phase-noise corrector 845 as described with reference to FIG. 8.

Figure 17:
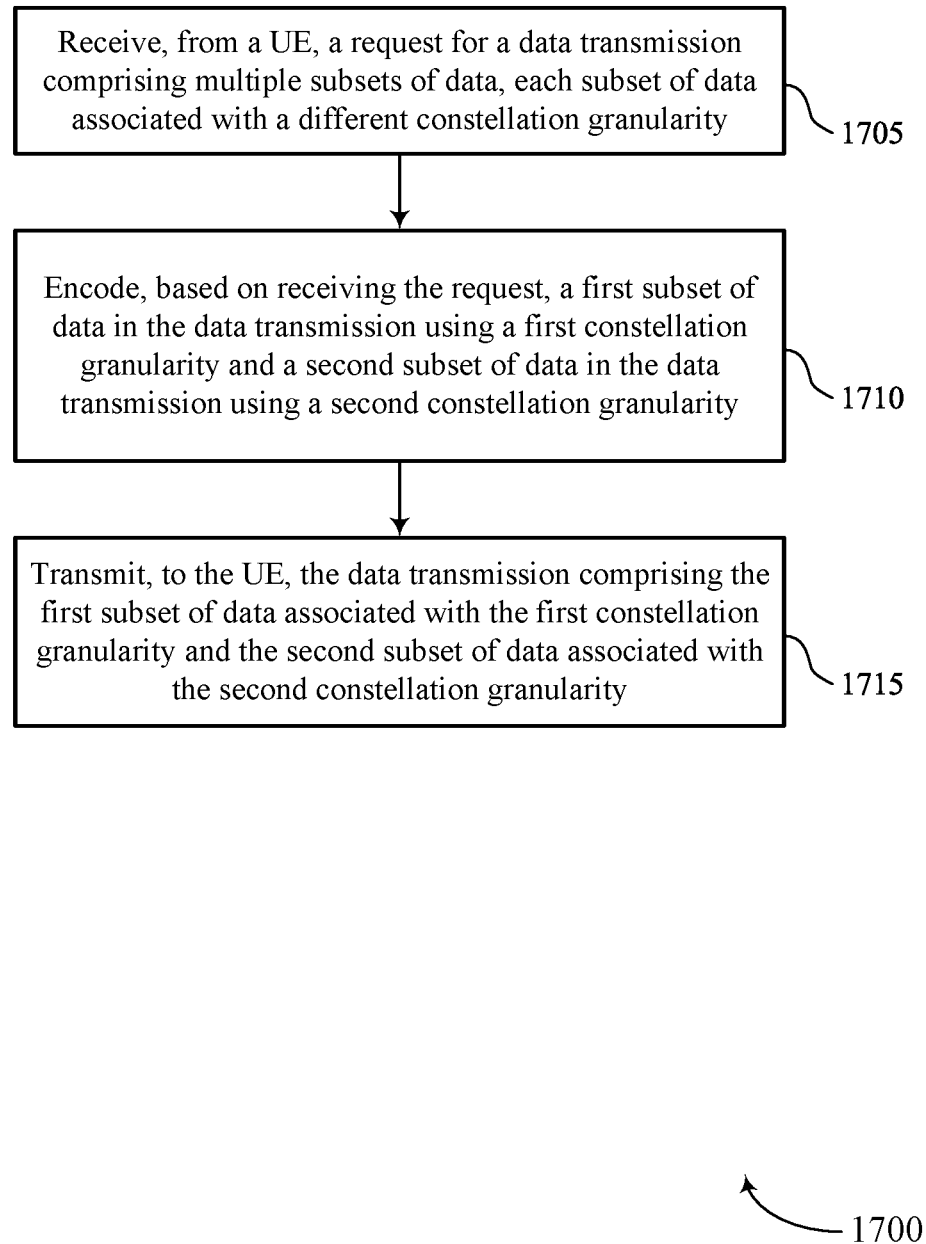

FIG. 17 shows a flowchart illustrating a method 1700 that supports iterative phase-noise cancellation in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a request for a data transmission including multiple subsets of data, each subset of data associated with a different constellation granularity. The operations of 1705 may be performed in accordance with examples as disclosed herein. In some examples, aspects of the operations of 1705 may be performed by a request receiver 1225 as described with reference to FIG. 12.

At 1710, the method may include encoding, based on receiving the request, a first subset of data in the data transmission using a first constellation granularity and a second subset of data in the data transmission using a second constellation granularity. The operations of 1710 may be performed in accordance with examples as disclosed herein. In some examples, aspects of the operations of 1710 may be performed by an encoding manager 1230 as described with reference to FIG. 12.

At 1715, the method may include transmitting, to the UE, the data transmission including the first subset of data associated with the first constellation granularity and the second subset of data associated with the second constellation granularity. The operations of 1715 may be performed in accordance with examples as disclosed herein. In some examples, aspects of the operations of 1715 may be performed by a data transmission component 1235 as described with reference to FIG. 12.

Figure 18:
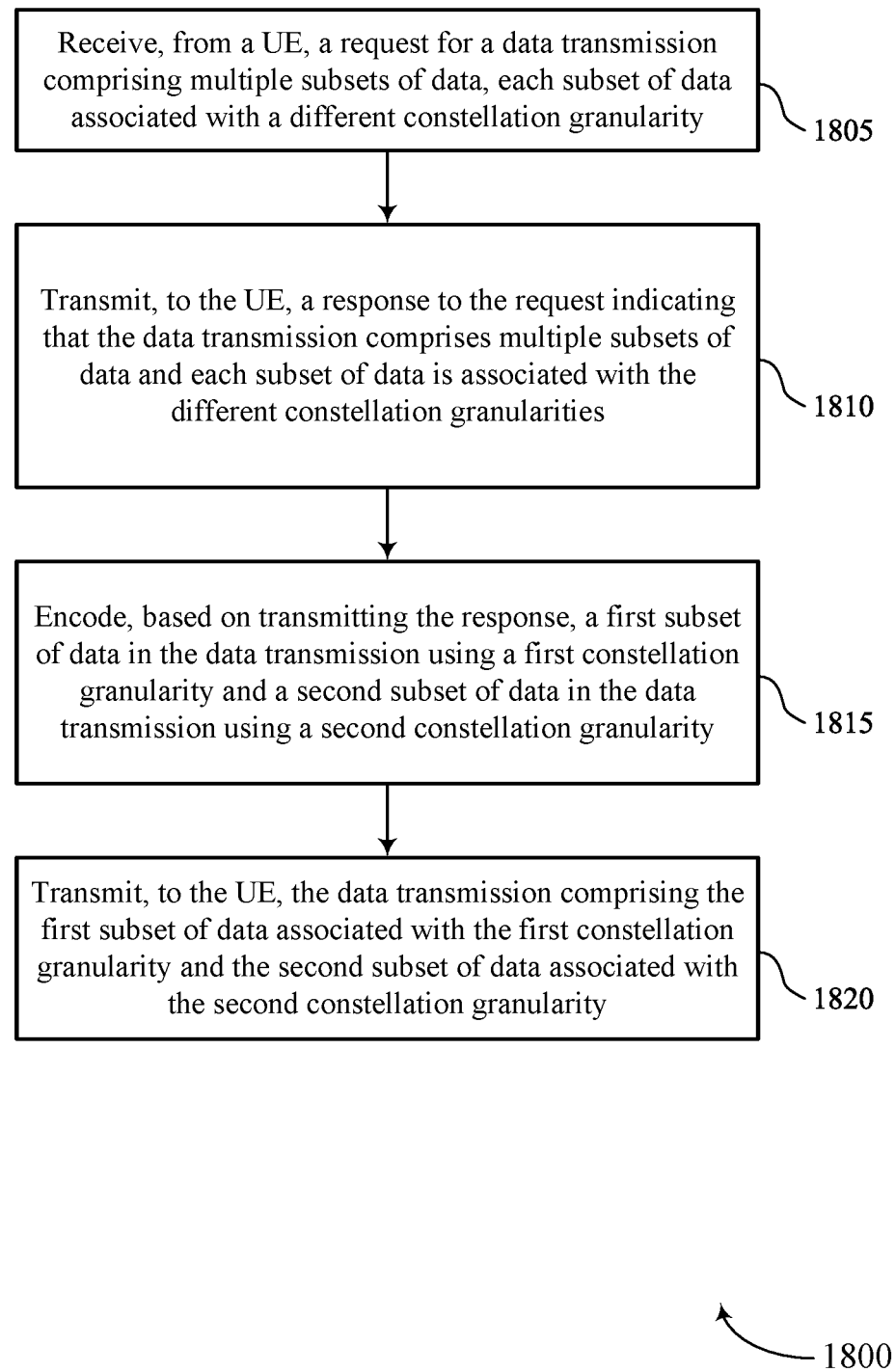

FIG. 18 shows a flowchart illustrating a method 1800 that supports iterative phase-noise cancellation in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a request for a data transmission including multiple subsets of data, each subset of data associated with a different constellation granularity. The operations of 1805 may be performed in accordance with examples as disclosed herein. In some examples, aspects of the operations of 1805 may be performed by a request receiver 1225 as described with reference to FIG. 12.

At 1810, the method may include transmitting, to the UE, a response to the request indicating that the data transmission includes multiple subsets of data and each subset of data is associated with the different constellation granularities, where the encoding is based on transmitting the response. The operations of 1810 may be performed in accordance with examples as disclosed herein. In some examples, aspects of the operations of 1810 may be performed by a response component 1240 as described with reference to FIG. 12.

At 1815, the method may include encoding, based on transmitting the response, a first subset of data in the data transmission using a first constellation granularity and a second subset of data in the data transmission using a second constellation granularity. The operations of 1815 may be performed in accordance with examples as disclosed herein. In some examples, aspects of the operations of 1815 may be performed by an encoding manager 1230 as described with reference to FIG. 12.

At 1820, the method may include transmitting, to the UE, the data transmission including the first subset of data associated with the first constellation granularity and the second subset of data associated with the second constellation granularity. The operations of 1820 may be performed in accordance with examples as disclosed herein. In some examples, aspects of the operations of 1820 may be performed by a data transmission component 1235 as described with reference to FIG. 12.

The following provides an overview of aspects of the present disclosure:

Aspect 1: A method for wireless communication at a UE, comprising: transmitting, to a base station, a request for a data transmission comprising multiple subsets of data, each subset of data associated with a different constellation granularity; receiving, from the base station in response to the request, the data transmission comprising a first subset of data associated with a first constellation granularity and a second subset of data associated with a second constellation granularity; estimating a first phase-noise associated with the first subset of data based at least in part on decoding the first subset of data; and estimating, based at least in part on estimating the first phase-noise associated with the first subset of data, a second phase-noise associated with the second subset of data.

Aspect 2: The method of aspect 1, further comprising: receiving, from the base station, a response to the request indicating that the data transmission comprises multiple subsets of data and each subset of data is associated with the different constellation granularities, wherein receiving the data transmission is based at least in part on receiving the response.

Aspect 3: The method of any of aspects 1 through 2, further comprising: performing a first phase-noise correction operation on the data transmission based at least in part on the estimated first phase-noise, wherein estimating the second phase-noise is based at least in part on performing the first phase-noise correction operation.

Aspect 4: The method of aspect 3, further comprising: performing a second phase-noise correction operation on the data transmission based at least in part on the second estimated phase-noise.

Aspect 5: The method of any of aspects 1 through 4, further comprising: determining that a signal to noise ratio associated with a transmission received from the base station fails to meet a threshold, wherein transmitting the request is based at least in part on the determining.

Aspect 6: The method of aspect 5, wherein the threshold is based at least in part on a constellation granularity associated with the transmission received from the base station.

Aspect 7: The method of any of aspects 1 through 6, wherein transmitting the request is based at least in part on a capability of the UE to decode data transmissions comprising multiple subsets of data each associated with the different constellation granularities.

Aspect 8: The method of any of aspects 1 through 7, wherein the data transmission further comprises a phase tracking reference signal; and estimating the second phase-noise associated with the second subset of data is further based at least in part on an estimated third phase-noise associated with the phase tracking reference signal.

Aspect 9: The method of any of aspects 1 through 8, further comprising: transmitting, to the base station after receiving the data transmission, a second request for a second data transmission comprising a single subset of data associated with a single constellation granularity; and receiving, from the base station based at least in part on transmitting the second request, the second data transmission comprising the single subset of data associated with the single constellation granularity.

Aspect 10: The method of aspect 9, further comprising: determining that a signal to noise ratio associated with the data transmission satisfies a threshold, wherein transmitting the second request is based at least in part on the determining.

Aspect 11: The method of any of aspects 9 through 10, further comprising: receiving, from the base station, a response to the second request indicating that the second data transmission comprises the single subset of data associated with the single constellation granularity, wherein receiving the second data transmission is based at least in part on receiving the response.

Aspect 12: The method of any of aspects 1 through 11, wherein the first constellation granularity is lower than the second constellation granularity; and the first subset of data spans a smaller quantity of resource elements than the second subset of data.

Aspect 13: The method of any of aspects 1 through 12, wherein the first subset of data spans a first set of time resources and a first set of frequency resources; and the second subset of data spans the first set of time resources and a second set of frequency resources.

Aspect 14: The method of aspect 13, wherein the first set of frequency resources are lower in frequency than the second set of frequency resources; and the first constellation granularity is lower than the second constellation granularity.

Aspect 15: A method for wireless communication at a base station, comprising: receiving, from a UE, a request for a data transmission comprising multiple subsets of data, each subset of data associated with a different constellation granularity; encoding, based at least in part on receiving the request, a first subset of data in the data transmission using a first constellation granularity and a second subset of data in the data transmission using a second constellation granularity; and transmitting, to the UE, the data transmission comprising the first subset of data associated with the first constellation granularity and the second subset of data associated with the second constellation granularity.

Aspect 16: The method of aspect 15, further comprising: transmitting, to the UE, a response to the request indicating that the data transmission comprises multiple subsets of data and each subset of data is associated with the different constellation granularities, wherein the encoding is based at least in part on transmitting the response.

Aspect 17: The method of any of aspects 15 through 16, further comprising: encoding a phase tracking reference signal in the data transmission using a third constellation granularity, wherein transmitting the data transmission is based at least in part on encoding the phase tracking reference signal.

Aspect 18: The method of any of aspects 15 through 17, further comprising: receiving, from the UE after transmitting the data transmission, a second request for a second data transmission comprising a single subset of data associated with a single constellation granularity; encoding the single subset of data using the single constellation granularity based at least in part on receiving the second request; and transmitting, to the UE, the second data transmission comprising the single subset of data associated with the single constellation granularity.

Aspect 19: The method of aspect 18, further comprising: transmitting, to the UE, a response to the second request indicating that the second data transmission comprises the single subset of data associated with the single constellation granularity, wherein transmitting the second data transmission is based at least in part on transmitting the response.

Aspect 20: The method of any of aspects 15 through 19, wherein the first constellation granularity is lower than the second constellation granularity; and the first subset of data spans a smaller quantity of resource elements than the second subset of data.

Aspect 21: The method of any of aspects 15 through 20, wherein the first subset of data spans a first set of time resources and a first set of frequency resources; and the second subset of data spans the first set of time resources and a second set of frequency resources.

Aspect 22: The method of aspect 21, wherein the first set of frequency resources are lower in frequency than the second set of frequency resources; and the first constellation granularity is lower than the second constellation granularity.

Aspect 23: An apparatus for wireless communication at a UE, comprising a processor; memory coupled with the processor; and instructions stored in the memory and executable by the processor to cause the apparatus to perform a method of any of aspects 1 through 14.

Aspect 24: An apparatus for wireless communication at a UE, comprising at least one means for performing a method of any of aspects 1 through 14.

Aspect 25: A non-transitory computer-readable medium storing code for wireless communication at a UE, the code comprising instructions executable by a processor to perform a method of any of aspects 1 through 14.

Aspect 26: An apparatus for wireless communication at a base station, comprising a processor; memory coupled with the processor; and instructions stored in the memory and executable by the processor to cause the apparatus to perform a method of any of aspects 15 through 22.

Aspect 27: An apparatus for wireless communication at a base station, comprising at least one means for performing a method of any of aspects 15 through 22.

Aspect 28: A non-transitory computer-readable medium storing code for wireless communication at a base station, the code comprising instructions executable by a processor to perform a method of any of aspects 15 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a base station, a request for a data transmission comprising multiple subsets of data associated with multiple increasing constellation granularities, each subset of data associated with a different constellation granularity of the multiple increasing constellation granularities;
    receiving, from the base station, a response to the request, the response indicating that the data transmission comprises the multiple subsets of data and each subset of data is associated with the different constellation granularity of the multiple increasing constellation granularities;
    receiving, from the base station and based at least in part on the response, the data transmission comprising a first subset of data associated with a first constellation granularity and a second subset of data associated with a second constellation granularity that is greater than the first constellation granularity based at least in part on the response indicating that the data transmission comprises the multiple increasing constellation granularities;
    estimating a first phase-noise associated with the first subset of data based at least in part on decoding the first subset of data; and
    estimating, based at least in part on estimating the first phase-noise associated with the first subset of data, a second phase-noise associated with the second subset of data.

2. The method of claim 1, further comprising:
    performing a first phase-noise correction operation on the data transmission based at least in part on the estimated first phase-noise, wherein estimating the second phase-noise is based at least in part on performing the first phase-noise correction operation.

3. The method of claim 2, further comprising:
    performing a second phase-noise correction operation on the data transmission based at least in part on the second estimated phase-noise.

4. The method of claim 1, further comprising:
    determining that a signal to noise ratio associated with a transmission received from the base station fails to meet a threshold, wherein transmitting the request is based at least in part on the determining.

5. The method of claim 4, wherein the threshold is based at least in part on a constellation granularity associated with the transmission received from the base station.

6. The method of claim 1, wherein transmitting the request is based at least in part on a capability of the UE to decode data transmissions comprising multiple subsets of data each associated with the different constellation granularities.

7. The method of claim 1, wherein:
    the data transmission further comprises a phase tracking reference signal; and
    estimating the second phase-noise associated with the second subset of data is further based at least in part on an estimated third phase-noise associated with the phase tracking reference signal.

8. The method of claim 1, further comprising:
    transmitting, to the base station after receiving the data transmission, a second request for a second data transmission comprising a single subset of data associated with a single constellation granularity; and
    receiving, from the base station based at least in part on transmitting the second request, the second data transmission comprising the single subset of data associated with the single constellation granularity.

9. The method of claim 8, further comprising:
    determining that a signal to noise ratio associated with the data transmission satisfies a threshold, wherein transmitting the second request is based at least in part on the determining.

10. The method of claim 8, further comprising:
    receiving, from the base station, a second response to the second request indicating that the second data transmission comprises the single subset of data associated with the single constellation granularity, wherein receiving the second data transmission is based at least in part on receiving the second response.

11. The method of claim 1, wherein:
    the first subset of data spans a smaller quantity of resource elements than the second subset of data.

12. The method of claim 1, wherein:
    the first subset of data spans a first set of time resources and a first set of frequency resources; and
    the second subset of data spans the first set of time resources and a second set of frequency resources.

13. The method of claim 12, wherein:
    the first set of frequency resources are lower in frequency than the second set of frequency resources; and
    the first constellation granularity is lower than the second constellation granularity.

14. A method for wireless communication at a base station, comprising:
    receiving, from a user equipment (UE), a request for a data transmission comprising multiple subsets of data associated with multiple increasing constellation granularities, each subset of data associated with a different constellation granularity of the multiple increasing constellation granularities;
    transmitting, to the UE, a response to the request, the response indicating that the data transmission comprises the multiple subsets of data and each subset of data is associated with the different constellation granularity of the multiple increasing constellation granularities;
    encoding, based at least in part on receiving the request and based at least in part on transmitting the response, a first subset of data in the data transmission using a first constellation granularity and a second subset of data in the data transmission using a second constellation granularity that is greater than the first constellation granularity based at least in part on the response indicating that the data transmission comprises the multiple increasing constellation granularities; and transmitting, to the UE, the data transmission comprising the first subset of data associated with the first constellation granularity and the second subset of data associated with the second constellation granularity.

15. The method of claim 14, further comprising:
encoding a phase tracking reference signal in the data transmission using a third constellation granularity, wherein transmitting the data transmission is based at least in part on encoding the phase tracking reference signal.

16. The method of claim 14, further comprising:
receiving, from the UE after transmitting the data transmission, a second request for a second data transmission comprising a single subset of data associated with a single constellation granularity;
encoding the single subset of data using the single constellation granularity based at least in part on receiving the second request; and
transmitting, to the UE, the second data transmission comprising the single subset of data associated with the single constellation granularity.

17. The method of claim 16, further comprising:
transmitting, to the UE, a second response to the second request indicating that the second data transmission comprises the single subset of data associated with the single constellation granularity, wherein transmitting the second data transmission is based at least in part on transmitting the second response.

18. The method of claim 14, wherein:
the first subset of data spans a smaller quantity of resource elements than the second subset of data.

19. The method of claim 14, wherein:
the first subset of data spans a first set of time resources and a first set of frequency resources; and
the second subset of data spans the first set of time resources and a second set of frequency resources.

20. The method of claim 19, wherein:
the first set of frequency resources are lower in frequency than the second set of frequency resources; and
the first constellation granularity is lower than the second constellation granularity.

21. An apparatus for wireless communication at a user equipment (UE), comprising:
one or more memories storing processor-executable code; and
one or more processors coupled with the one or more memories, wherein the one or more processors are configured to cause the apparatus to:
transmit, to a base station, a request for a data transmission comprising multiple subsets of data associated with multiple increasing constellation granularities, each subset of data associated with a different constellation granularity of the multiple increasing constellation granularities;
receive, from the base station, a response to the request, the response indicating that the data transmission comprises the multiple subsets of data and each subset of data is associated with the different constellation granularity of the multiple increasing constellation granularities;
receive, from the base station and based at least in part on the response, the data transmission comprising a first subset of data associated with a first constellation granularity and a second subset of data associated with a second constellation granularity that is greater than the first constellation granularity based at least in part on the response indicating that the data transmission comprises the multiple increasing constellation granularities;
estimate a first phase-noise associated with the first subset of data based at least in part on decoding the first subset of data; and
estimate, based at least in part on estimating the first phase-noise associated with the first subset of data, a second phase-noise associated with the second subset of data.

22. The apparatus of claim 21, wherein the one or more processors are further configured to cause the apparatus to:
perform a first phase-noise correction operation on the data transmission based at least in part on the estimated first phase-noise, wherein estimating the second phase-noise is based at least in part on performing the first phase-noise correction operation.

23. The apparatus of claim 22, wherein the one or more processors are further configured to cause the apparatus to:
perform a second phase-noise correction operation on the data transmission based at least in part on the second estimated phase-noise.

24. An apparatus for wireless communication at a base station, comprising:
one or more memories storing processor-executable code; and
one or more processors coupled with the one or more memories, wherein the one or more processors are configured to cause the apparatus to:
receive, from a user equipment (UE), a request for a data transmission comprising multiple subsets of data associated with multiple increasing constellation granularities, each subset of data associated with a different constellation granularity of the multiple increasing constellation granularities;
transmit, to the UE, a response to the request, the response indicating that the data transmission comprises the multiple subsets of data and each subset of data is associated with the different constellation granularity of the multiple increasing constellation granularities;
encode, based at least in part on receiving the request and based at least in part on transmitting the response, a first subset of data in the data transmission using a first constellation granularity and a second subset of data in the data transmission using a second constellation granularity that is greater than the first constellation granularity based at least in part on the response indicating that the data transmission comprises the multiple increasing constellation granularities; and
transmit, to the UE, the data transmission comprising the first subset of data associated with the first constellation granularity and the second subset of data associated with the second constellation granularity.

25. The apparatus of claim 24, wherein the one or more processors are further configured to cause the apparatus to:
encode a phase tracking reference signal in the data transmission using a third constellation granularity, wherein transmitting the data transmission is based at least in part on encoding the phase tracking reference signal.

26. The apparatus of claim 24, wherein the one or more processors are further configured to cause the apparatus to:
- receive, from the UE after transmitting the data transmission, a second request for a second data transmission comprising a single subset of data associated with a single constellation granularity;
- encode the single subset of data using the single constellation granularity based at least in part on receiving the second request; and
- transmit, to the UE, the second data transmission comprising the single subset of data associated with the single constellation granularity.

* * * * *